United States Patent [19]
Oie et al.

[11] Patent Number: 5,438,591
[45] Date of Patent: Aug. 1, 1995

[54] QUADRATURE AMPLITUDE MODULATION TYPE DIGITAL RADIO COMMUNICATION DEVICE AND METHOD FOR PREVENTING ABNORMAL SYNCHRONIZATION IN DEMODULATION SYSTEM

[75] Inventors: Yasunori Oie, Tokyo; Mitsuru Hirama, Kawasaki; Yasushi Fujii; Hidekazu Tanaka, both of Tokyo, all of Japan

[73] Assignee: Kabushiki Kaisha Toshiba, Kawasaki, Japan

[21] Appl. No.: 921,687

[22] Filed: Jul. 30, 1992

[30] Foreign Application Priority Data

Jul. 31, 1991 [JP] Japan .................................. 3-191448
Oct. 17, 1991 [JP] Japan .................................. 3-269519

[51] Int. Cl.⁶ .................. H03K 9/00; H04L 27/06
[52] U.S. Cl. .......................... 375/261; 329/306; 329/349; 455/259; 455/263; 455/265; 375/316; 375/344; 375/362; 375/324
[58] Field of Search ............... 375/10, 119, 20, 80, 375/81, 39, 97, 93, 120, 75; 329/306, 308, 319, 320, 349; 455/208, 214, 259, 263, 265

[56] References Cited
U.S. PATENT DOCUMENTS

| | | | |
|---|---|---|---|
| 4,317,206 | 2/1982 | Nossen .............................. | 375/10 |
| 4,672,631 | 6/1987 | Suzuki et al. ..................... | 375/14 |
| 4,713,630 | 12/1987 | Mathews ............................ | 375/81 |
| 4,755,763 | 7/1988 | Yoshida ............................ | 375/39 |
| 4,773,083 | 9/1988 | Baumbach et al. ................. | 375/10 |
| 4,866,395 | 9/1989 | Hostetter ......................... | 375/81 |
| 4,871,973 | 10/1989 | Yoshihara ......................... | 375/81 |

*Primary Examiner*—Stephen Chin
*Assistant Examiner*—Amanda T. Le
*Attorney, Agent, or Firm*—Finnegan, Henderson Farabow, Garrett & Dunner

[57] ABSTRACT

This invention relates to an abnormal synchronization preventing device used in a multiple value quadrature modulation type radio device and the abnormal synchronization preventing device includes a monitoring circuit for monitoring the carrier pull-out based on demodulated base band signals to output a carrier pull-out alarm signal, an abnormal synchronization detection circuit for sampling the reception signal level at a speed twice the transmission speed of reception data according to identification data and detecting abnormal synchronization according to whether or not the detection area of sampled data lies in a specified area, an abnormal synchronization preventing circuit for generating a signal for a preset period of time when abnormal synchronization is detected in a case where the carrier pull-out alarm signal is not output, and a selection circuit for receiving a reference signal used for generating a reference carrier frequency signal having a frequency close to the frequency of the carrier wave and a phase difference signal, selecting the phase difference signal as the control signal in the normal state, and selects the reference signal as the control signal while receiving an output signal of the abnormal synchronization preventing circuit and supplying the selected signal to an oscillator.

6 Claims, 12 Drawing Sheets

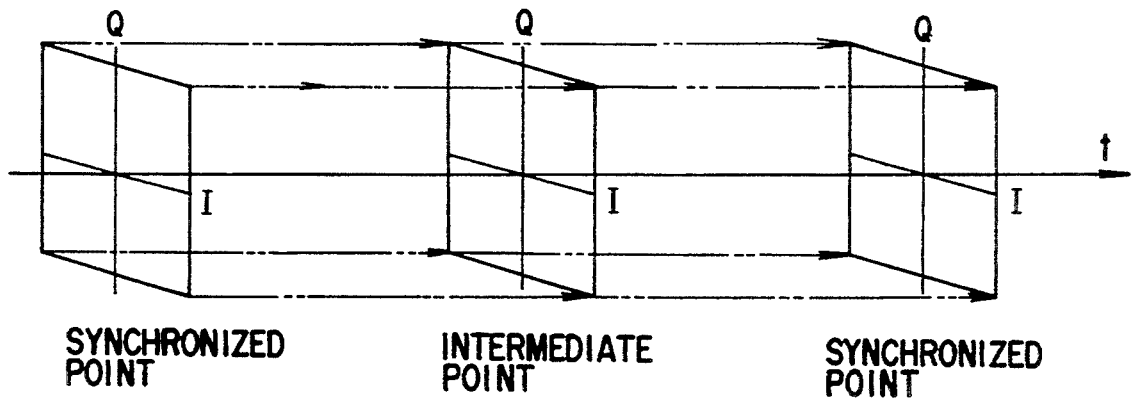
SYNCHRONIZED POINT    INTERMEDIATE POINT    SYNCHRONIZED POINT
F I G. 7
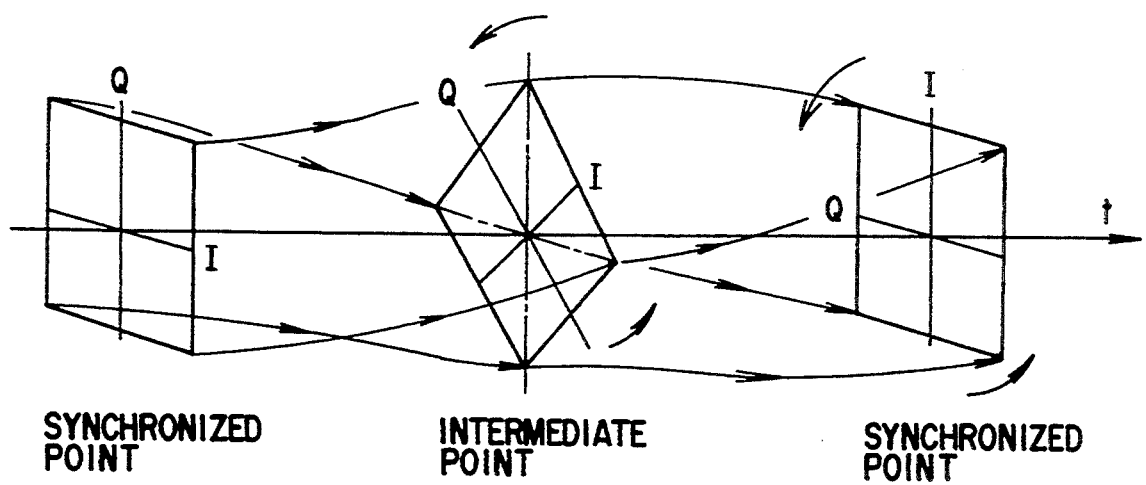
SYNCHRONIZED POINT    INTERMEDIATE POINT    SYNCHRONIZED POINT
F I G. 8

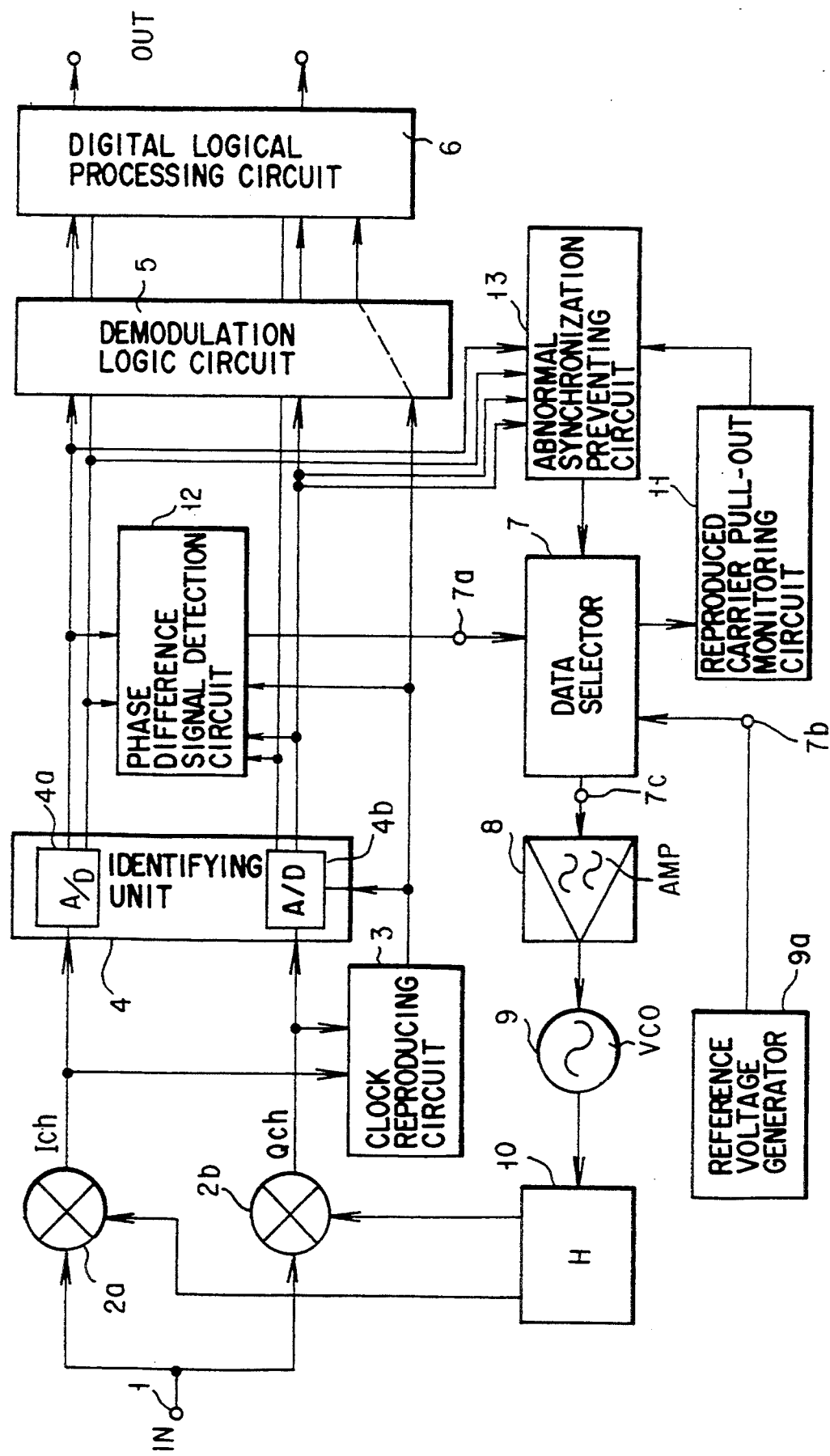
F I G. 9

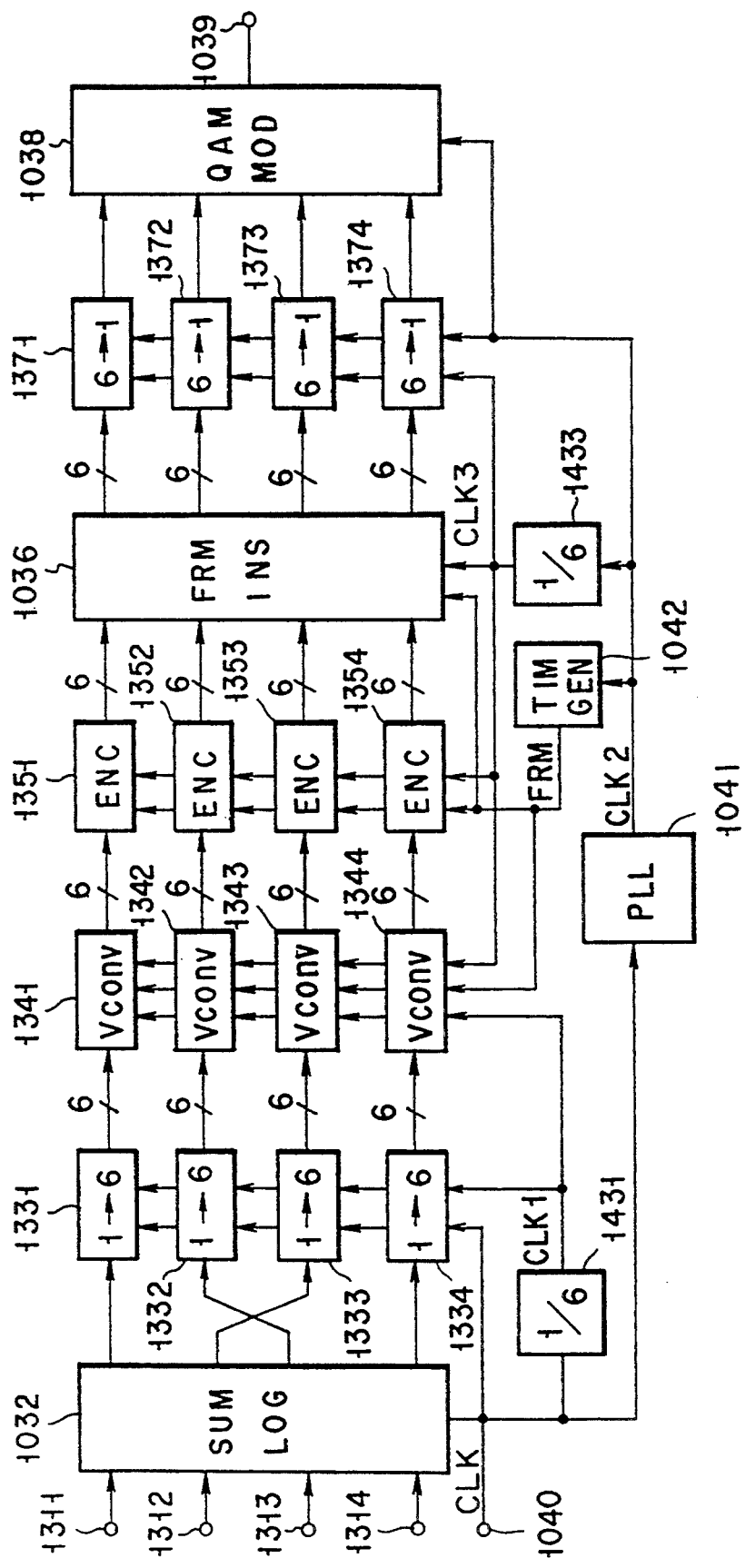
F I G. 11

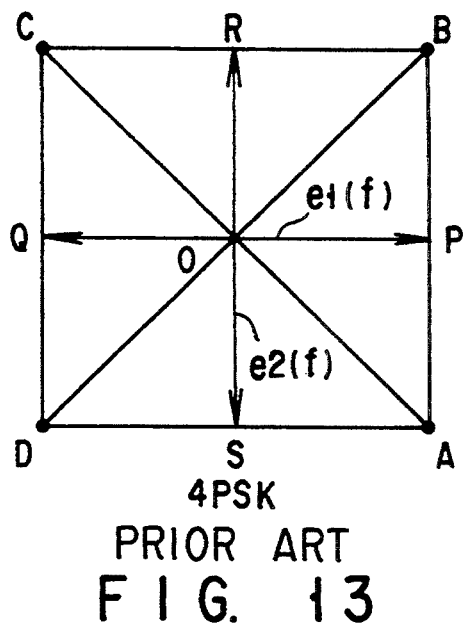
PRIOR ART
FIG. 13
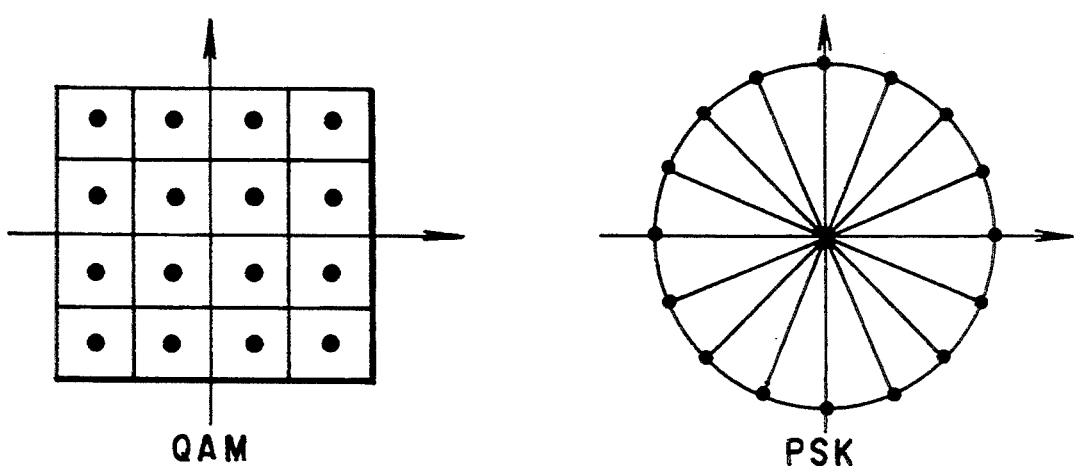
PRIOR ART
FIG. 14A
PRIOR ART
FIG. 14B

QUADRATURE AMPLITUDE MODULATION TYPE DIGITAL RADIO COMMUNICATION DEVICE AND METHOD FOR PREVENTING ABNORMAL SYNCHRONIZATION IN DEMODULATION SYSTEM

BACKGROUND OF THE INVENTION

1. Field of the Invention

This invention relates to a demodulation device of a $2^n$-value (n=1, 2, 3, ...) quadrature amplitude modulation type digital radio communication device and more particularly to the improvement of an abnormal synchronization preventing circuit in the demodulation device. In the $2^n$-value quadrature amplitude modulation type digital radio communication device of this invention, data of high transmission speed can be processed even if a device of low operation speed is used.

2. Description of the Related Art

Recently, with the increasing needs for desired communication and with the development of the communication technology, various types of communication systems have been developed. Among them, a digital microwave radio communication system is included.

The digital microwave radio communication system modulates a carrier wave of microwave, for example, by use of the quadrature phase shift keying (QPSK) system or multiple value quadrature amplitude modulation (multiple value QAM) system and then transmits digital data by radio.

The QAM system which is a typical quadrature modulation system is a system for changing both of the amplitude and phase of the carrier wave and a highly efficient modulation can be attained by thus changing the two parameters simultaneously. The QAM system can be effected in principle by combining two quadratic AM-modulated (amplitude-modulated) waves and, as a result, the thus derived signal is called a QAM wave.

Since the QAM wave is created based on an AM wave which is easiest to deal with and a desired point on the phase plane can be selected as a coding point, an ideal code arrangement can be attained and the QAM wave may play an important role in the multiple value transmission.

The QAM is divided into a QAM for converting the quantized values of the two quadrature AM waves into binary values and a QAM for converting the quantized values into multiple values, and the latter QAM is called a multiple value QAM.

Now, the principle of the QAM is explained. The feature of QAM is effectively used in the multiple value transmission of 16 or more values, but in this case, a 4-value transmission is used as an example in order to simplify the explanation.

Like the analog modulation system, the basic modulation system for modulating a sine carrier wave by use of a digital signal is divided into three modulation systems: amplitude modulation system, phase modulation system and frequency modulation system. In the digital modulation, the above modulation systems are also called as follows. That is, the amplitude modulation system is an ASK (amplitude shift keying) system, the phase modulation system is a PSK (phase shift keying) system and the frequency modulation system is a FSK (frequency shift keying) system.

In general, a system for transmitting a signal by use of n coding points arranged at a regular interval ($2\pi/n$) on a circumference indicating the phase of the carrier wave is called an n-phase PSK, but in an actual case, n is set to $2^m$ (m is a natural number), and in this case, transmission of binary pulse m-series can be effected.

A 4-phase PSK wave can be derived by a quadrature combination of two 2-phase PSK (phase shift keying) waves and the 2-phase PSK wave can be derived by use of a binary ASK wave. Therefore, if the 4-phase PSK signal is E(t), two 2-phase PSK signals are $e_1(t)$ and $e_2(t)$ and the angular frequency is $\omega_c$, then the 4-phase PSK signal can be expressed by the following equation (1).

$$E(t) = e_1(t) + e_2(t) \quad (1)$$
$$= \frac{\psi_1(t)}{\sqrt{2}} \cos(\omega_c t + \theta) + \frac{\psi_2(t)}{\sqrt{2}} \sin(\omega_c t + \theta)$$

where $\psi_1(t)$ and $\psi_2(t)$ indicate waveforms of independent binary base band signals (modulated signals) and are defined as follows.

$$|\psi_1(t)| \leq 1, \quad |\psi_2(t)| \leq 1 \quad (2)$$

Further, E(t) can be expressed as follows by use of the combined amplitude (envelope) and phase angle.

$$E(t) = \frac{1}{2}\sqrt{|\psi_1(t)|^2 + |\psi_2(t)|^2} \cos\left\{\omega_c t + \theta + \tan^{-1}\frac{\psi_2(t)}{\psi_1(t)}\right\} \quad (3)$$

Since the bandwidths of $\psi_1(t)$ and $\psi_2(t)$ are not infinite and are generally limited, the amplitude thereof becomes smaller than "1" at time other than the center of the pulse (sampling time) and the absolute value of E(t) becomes smaller than "1". This indicates that the locus of E(t) is drawn along a square ABCD and diagonal lines AC and BD in the vector diagram of FIG. 13. In this case, E(t) is different from a pure PM wave, but since it satisfies the condition of constant amplitude when the range is limited to the sampling time, it can be regarded as a PSK wave. Like E(t), a signal which can be derived by a combination of two quadrature AM waves is the QAM wave.

FIG. 14A indicates the code arrangement on a 2-dimensional phase plane in the case of 16 values and indicates a grid-form QAM. FIG. 14B is a diagram indicating PSK.

The grid-form QAM as shown in FIG. 14A has a relatively good SN characteristic and the quadrature modulation technique for superposing information on the sine and cosine components of the carrier wave can be used. The grid-form QAM can be derived by combining two quadrature AM signal waves of n values (generally, $n=2^m$) and has $n^2$ coding points.

Assuming now that $\psi_1(t)$ and $\psi_2(t)$ are base band pulses (modulated signal) having amplitudes of n values and the maximum values of the absolute values of $\psi_1(t)$ and $\psi_2(t)$ are set to "1", the general equation of the waveform E(t) of unit amplitude becomes equal to the equation (1). If E(t) has $2^{2m}$ coding points, four coding points are set at the same distance from the original point when m=1, and the code arrangement coincides with the code arrangement of the 4-phase PSK. It is called 16 QAM, 64 QAM and 256 QAM when m=2, 3 and 4, respectively.

The QAM wave of 16 or more values satisfies the condition that both of the amplitude and phase contain information. Therefore, the 16 or more QAM may be used as the QAM wave and the modulation method most widely used in the recent digital radio system is the 16 QAM.

When a digital radio signal which is modulated by use of the multiple value QAM is reproduced, the demodulation must be effected by use of synchronous detection since both of the amplitude and phase contain information.

A case wherein the 16 QAM is used is explained. In the reception system, a received carrier wave is divided into two portions which are subjected to the synchronous detection by use of two reference carrier waves of 90° phase difference (since QAM is derived by a combination of two quadrature AM waves, a reference carrier wave having a phase of one of the two axes which intersect at right angles, for example, I axis and a reference carrier wave having a phase of the other axis or Q axis are used). By the synchronous detection, detected outputs of the I-axis component and Q-axis component can be derived.

For the detected outputs of the I-axis component and Q-axis component, that one of the 16-level codes which is received is determined by an identifying circuit and 4-series binary pulses are reproduced according to the type of the received code. That is, in the case of 16 QAM wave, one of the 16-level codes is determined by the identifying circuit, converted into 4-bit parallel data and output.

In order to create the reference carrier wave for determining the phase reference at the time of synchronous detection, the following methods may be used as a typical method. One of them is a method of deriving a reference carrier wave by using an independent carrier generator (generally, a voltage-controlled oscillator VCO is used) provided in the receiver and controlling the phase of the carrier generator to a constant value, and another method is a method of extracting part of the received signal, delaying the extracted part by time of one time slot and using the delayed signal as a reference carrier wave for the succeeding pulses. The latter method is a method used for delayed detection and therefore the former method is generally used.

In the PSK synchronous detection method, the phase reference must be derived from the received signal transmitted. However, in this case, since there occurs a problem that the phase of the received signal of PSK continuously varies by modulation, a constant control signal must be created by removing the modulation component and fed back to the voltage-controlled oscillator in order to derive the reference phase. The frequency multiplying method or inverse modulation method may be used as a method for removing the influence due to the modulated component.

The frequency multiplying method is called a base band processing type method since the demodulation signal of the base band bandwidth is multiplied. As a base band processing type carrier reproducing circuit, a circuit for effecting the logical operation for the demodulation signal in the base band bandwidth, effecting the equivalent operation of multiplying the phase and controlling the phase of the reference oscillator according to the output thus obtained and it is also called a Costas type carrier reproducing circuit.

When a Costas type carrier reproducing circuit is used, the circuit construction thereof may be made simple at a low cost in comparison with a case wherein the inverse modulation method is used and the circuit is advantageous in the economical point of view and in the low power consumption and therefore it is widely used.

Thus, the Costas type carrier reproducing circuit has the above advantages, but the operation thereof becomes stable at a frequency different from a normal carrier frequency in the case of low speed transmission and a problem of abnormal synchronization in which the carrier synchronization becomes abnormal, for example, may occur. If the carrier reproducing loop characteristic is changed in order to solve the above problem, another problem that the pull-in frequency and complex modulation characteristics are deteriorated may occur.

Further, the data transmission speed generally tends to be enhanced, but a circuit of high-speed operation must be used as a circuit device in order to cope with the high speed transmission. However, the cost of the device of high speed operation is high, and in order to cope with the high speed transmission, the system price will be significantly enhanced. Therefore, a method of reducing the cost of a system of high-speed data transmission is an important subject.

SUMMARY OF THE INVENTION

A first object of this invention is to provide a Costas type digital radio communication device which is inexpensive and in which abnormal synchronization can be prevented without deteriorating the transmission characteristic.

A second object of this invention is to provide an abnormal synchronization preventing method for preventing abnormal synchronization without deteriorating the transmission characteristic in a Costas type digital radio communication device.

A third object of this invention is to provide a digital radio communication device which can be constructed by use of a device of low-speed operation even when data of high transmission speed is dealt with.

In order to attain the first object, this invention is constructed as follows.

A demodulation device of a quadrature amplitude modulation type digital radio device in which a phase difference signal is derived by identifying the levels of demodulated base band signals by an identifying unit, the phase difference signal is used as a control signal to control an oscillation frequency so as to derive an oscillation frequency corresponding to the phase difference signal, an output signal having the thus derived frequency is used as a reproduced carrier wave, the reproduced carrier wave is subjected to the 90° phase-shifting process to create two reproduced carrier waves with 90° phase difference which are separately mixed with a reception signal to create demodulated base band signals, a transmission clock of the reception signal is reproduced from the demodulated base band signals to define timings for identification of the levels of the demodulated base band signals, and the reception signal is restored based on data derived by the identification, comprises:

a monitoring circuit for monitoring the carrier pull-out based on the demodulated base band signals and outputting a carrier pull-out alarm signal when the carrier pull-out occurs;

an abnormal synchronization signal generating circuit for sampling the reception signal level at a speed twice the transmission speed of the reception data based on the identification data and detecting abnormal synchronization according to whether or not a detection area of the sampled data lies in a predetermined area;

an abnormal synchronization signal generating circuit for generating a signal for a preset period of time when the abnormal synchronization is detected in a case where the carrier pull-out alarm signal is not generated; and a selection circuit for receiving a reference signal used for generating a signal having a reference carrier frequency nearly equal to the frequency of the carrier and the phase difference signal, selecting the phase difference signal as the control signal in the normal operation state, selecting the reference signal as the control signal and supplying the same to the oscillator while receiving an output signal of the abnormal synchronization signal generating circuit; wherein the identifying unit is operated at a speed twice the transmission clock speed to effect the identification.

with the above construction, the phase difference signal is derived by identifying the levels of the demodulated base band signals and supplied as the control signal to the oscillator so as to cause the oscillator to oscillate according to the control signal and produce the reproduced carrier wave, the reproduced carrier wave is divided into two reproduced carrier waves having a 90° phase difference from each other, the two reproduced carrier waves are multiplied with the reception signal to derive demodulated base band signals of I-axis and Q-axis components, and reception data is reproduced based on the demodulation base band signals. At this time, if the frequency of the reproduced carrier wave does not coincide with the carrier frequency of the reception signal, the reproduced reception data will contain an error due to the carrier pull-out, data is not correctly reproduced and therefore the oscillation frequency of the oscillator means is controlled and adjusted to a desired value. However, in the case of a signal whose transmission speed is low, abnormal synchronization in which synchronization with the reproduced carrier wave in the synchronous detection is stabilized at a frequency different from the original carrier frequency may occur, and in this case, data cannot be correctly reproduced.

Therefore, in the device of this invention, the monitoring circuit is used to monitor the carrier pull-out by use of the demodulated base band signal. Further, the level of reception data demodulated from the demodulated base band signal is sampled at a speed twice the transmission speed of the reception data by the abnormal synchronization detecting circuit. In the abnormal synchronization detecting circuit, abnormal synchronization is detected according to the position of the detected area of the sampled data. When the abnormal synchronization is detected, the abnormal synchronization signal generating circuit generates a signal for a preset period of time if there occurs no carrier pull-out. The selection circuit receives the reference signal used for generating a signal of the reference carrier frequency close to the frequency of the carrier wave and the phase difference signal, normally selects the phase difference signal as the control signal, and selects the reference signal as the control signal and supplies the same to the oscillator while receiving the output signal from the abnormal synchronization signal generating circuit.

As a result, if the abnormal synchronization which corresponds to the synchronization detection state set up by the reproduced carrier wave having a frequency different from the original carrier frequency occurs, the oscillation of the oscillator is controlled by the reference signal for a preset period of time. After this, the oscillation of the oscillator is controlled by the phase difference signal derived based on the demodulated base band signals. In this case, since a frequency determined by the oscillation control of the oscillator based on the reference signal is approximately equal to the carrier frequency of the reception signal, the demodulation system is set to a state which is extremely close to the correct phase by the reproduced carrier wave of the above frequency. Since the pull-in operation by use of the phase difference signal is started from the above state, correct synchronization can be attained.

In this invention, the abnormal synchronization detecting circuit samples the reception data demodulated according to the demodulated base band signal at a speed twice the transmission speed of the reception data. This means that the state of a signal at intermediate points between original sampling points can be checked on the phase plane. That is, the synchronization state can be checked based on the demodulation eye pattern on the phase plane and determination of normal synchronization or abnormal synchronization can be made according to the position on the phase plane on which the signal level appears.

Thus, the abnormal synchronization can be detected in a simplified manner. Further, when the normal synchronization is determined according to the pull-out alarm, the carrier reproducing loop is temporarily cut off, and after a frequency which is extremely close to the frequency set at the time of normal synchronization is generated, the loop is restored and then the synchronizing operation is effected so that occurrence of abnormal synchronization can be prevented.

Thus, a demodulation device of the quadrature amplitude modulation type digital radio device which can prevent occurrence of abnormal synchronization with a simple construction can be obtained.

In order to attain the second object, this invention is designed as follows.

In a demodulation device of a quadrature amplitude modulation type digital radio device in which a phase difference signal is derived by identifying the levels of demodulated base band signals by means of an identifying unit, an oscillation frequency corresponding to the phase difference signal is determined by using the phase difference signal as a control signal for controlling the oscillation frequency and is used as a reproduced carrier wave, the reproduced carrier wave is subjected to the 90° phase-shifting process to create two reproduced carrier waves which are separately multiplied by a reception signal to create demodulated base band signals, a transmission clock of the reception signal is reproduced from the demodulated base band signals to define timings for identification of the levels of the demodulated base band signals, and the reception signal is restored based on data derived by the identification, an abnormal synchronization preventing method used at the time of restoring the reception signal based on data derived by the identification comprises the steps of:

monitoring the carrier pull-out based on the demodulated base band signals and outputting a carrier pull-out alarm signal when the carrier pull-out occurs;

causing the identifying unit to effect the sampling operation at a speed twice that of the transmission clock and generating identification data;

detecting the level of the reception signal based on the identification data thus derived and detecting abnormal synchronization according to whether or not the detected area lies in a predetermined area;

generating an abnormal synchronization detection signal for a preset period of time when the abnormal synchronization is detected and when the carrier pull-out alarm signal is not generated; and selecting a phase difference signal among a reference signal used for generating a signal having a reference carrier frequency nearly equal to the frequency of the carrier and the phase difference signal as the control signal in the normal operation state, and selecting the reference signal as the control signal and supplying the same to the oscillator while the abnormal synchronization detection signal is generated.

That is, in the abnormal synchronization preventing method used for demodulation in the multiple value quadrature modulation type digital radio communication using a Costas type carrier reproducing loop, when data is restored by setting synchronization by use of a reproduced carrier wave reproduced from the reception signal and extracting data at the synchronized points, the carrier pull-out with respect to the reproduced carrier wave having the same frequency as the carrier wave and abnormal synchronization in which synchronization is set up by the reproduced carrier wave having a frequency different from that of the carrier wave are monitored. Thus, determination of the abnormal synchronization or the normal synchronization by the carrier wave of normal frequency is effected, the carrier reproducing loop is interrupted for a preset period of time at the time of occurrence of abnormal synchronization and the oscillator (voltage-controlled oscillator) is operated by a predetermined reference signal. After the oscillation at a frequency extremely close to that of the normal synchronization is effected, the carrier reproducing loop is returned to the initial state. Thus, the normal synchronization can be attained.

The level of data as represented by the demodulated eye pattern on the phase plane is sampled by a two-multiplied clock which is obtained by multiplying the reproducing clock signal by 2 and the state at a timing at which data transition occurs is monitored. By this monitoring operation, abnormal synchronization is detected. Then, when the abnormal synchronization is detected and it is determined that no carrier pull-out occurs, the oscillation frequency of the carrier reproducing loop is forcedly controlled to generate a preset reproduced carrier wave having a frequency extremely close to the carrier frequency on the transmission side, and then, the forcedly controlling operation is interrupted, and the carrier reproducing loop is returned to the initial state to attain normal synchronization, thereby preventing occurrence of abnormal synchronization.

Thus, occurrence of abnormal synchronization can be easily prevented at the time of demodulation in the multiple value quadrature modulation type digital radio communication using a Costas type carrier reproducing loop.

Further, in order to attain the third object, this invention is designed as follows.

A $p^m$-element (P is a primary number and m is a positive integer) error correction circuit used on the encoder side of the $2^{2n}$-value (n=1, 2, 3, . . . ) quadrature amplitude modulation type digital microwave radio communication comprises a serial-parallel converting circuit for converting an input signal into the m-series parallel form; a speed converting circuit constructed by use of elastic store, for effecting speed conversion for a signal which is converted into the parallel form by the serial-parallel converting circuit; an error correction coding circuit for effecting the error correction coding operation for a signal which is subjected to the speed conversion by the speed converting circuit; and a parallel-serial converting circuit for converting an m-series signal which is subjected to the error correction coding process by the error correction coding circuit into the one-series form.

A $p^m$-element (P is a primary number and m is a positive integer) error correction circuit used on the decoder side of the $2^{2n}$-value (n=1, 2, 3, . . . ) quadrature amplitude modulation type digital microwave radio communication comprises a serial-parallel converting circuit for converting an input signal into the m-series parallel form; an error correction decoding circuit for effecting the error correction decoding operation for a signal which is converted into the parallel form by the serial-parallel converting circuit; a speed converting circuit constructed by use of elastic store, for effecting speed conversion for a parallel signal which is output from the error correction decoding circuit; and a parallel-serial converting circuit for converting an m-series signal which is subjected to the speed conversion by the speed converting circuit into the one-series form.

In the operation of $p^m$-element error correction circuit on the encoder side of $2^{2n}$-value quadrature amplitude modulation type digital microwave radio communication, the case is made of $p^m$-element correcting signals. Therefore, an input signal is converted into the m-series parallel form by the serial-parallel converting circuit on the encoder side, the signal converted into the parallel form is subjected to the speed conversion by the speed converting circuit using the elastic store, the error correction coding operation is effected by the error correction coding circuit, and then the m-series signal is converted into the one-series form by the parallel-serial converting circuit.

Further, on the decoder side, an input signal is converted into the m-series parallel form by the serial-parallel converting circuit, the signal converted into the parallel form is subjected to the speed conversion by the speed converting circuit using the elastic store, the error correction decoding process by the error correction decoding circuit, the error correction decoded signal is subjected to the speed conversion by the speed converting circuit using the elastic store, and then the m-series signal is converted into the one-series form by the parallel-serial converting circuit.

As described above, according to this invention, since the signal converted into the m-series parallel form can be subjected to the speed conversion, the clock speed of the signal input to the speed converting circuit can be lowered to 1/m times the original speed, and consequently, a signal of the clock speed which is equal to or lower than m times the critical operation speed of an element of elastic store can be processed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a diagram for illustrating the operation of this invention and is a diagram showing the transition of phase planes at synchronized points and an intermediate point between the synchronized points obtained in a case where a demodulated signal at the time of normal synchronization is sampled by a two-multiplied clock;

FIG. 8 is a diagram for illustrating the operation of this invention and is a diagram showing the transition of phase planes at synchronized points and an intermediate point between the synchronized points obtained in a case where a demodulated signal at the time of abnormal synchronization is sampled by a two-multiplied clock;

FIG. 9 is a block diagram showing the detail construction of a demodulating circuit in a case where this invention is applied to a 16 QAM;

FIG. 11 is a block diagram showing another example of the construction of an error correction circuit (encoder side) according to this invention;

FIG. 13 is a diagram for illustrating the prior art and is a diagram for illustrating a 4-phase PSK wave obtained by a quadratic combination of binary AM signals; and FIG. 14A is a diagram for illustrating the prior art and is a diagram showing the phase plane arrangement of QAM and FIG. 14B is a diagram showing the phase plane arrangement of PSK.

DETAILED DESCRIPTION OF THE PREFERRED EMBODIMENTS

There will now be described an embodiment of this invention with reference to the accompanying drawings.

Figure 1:
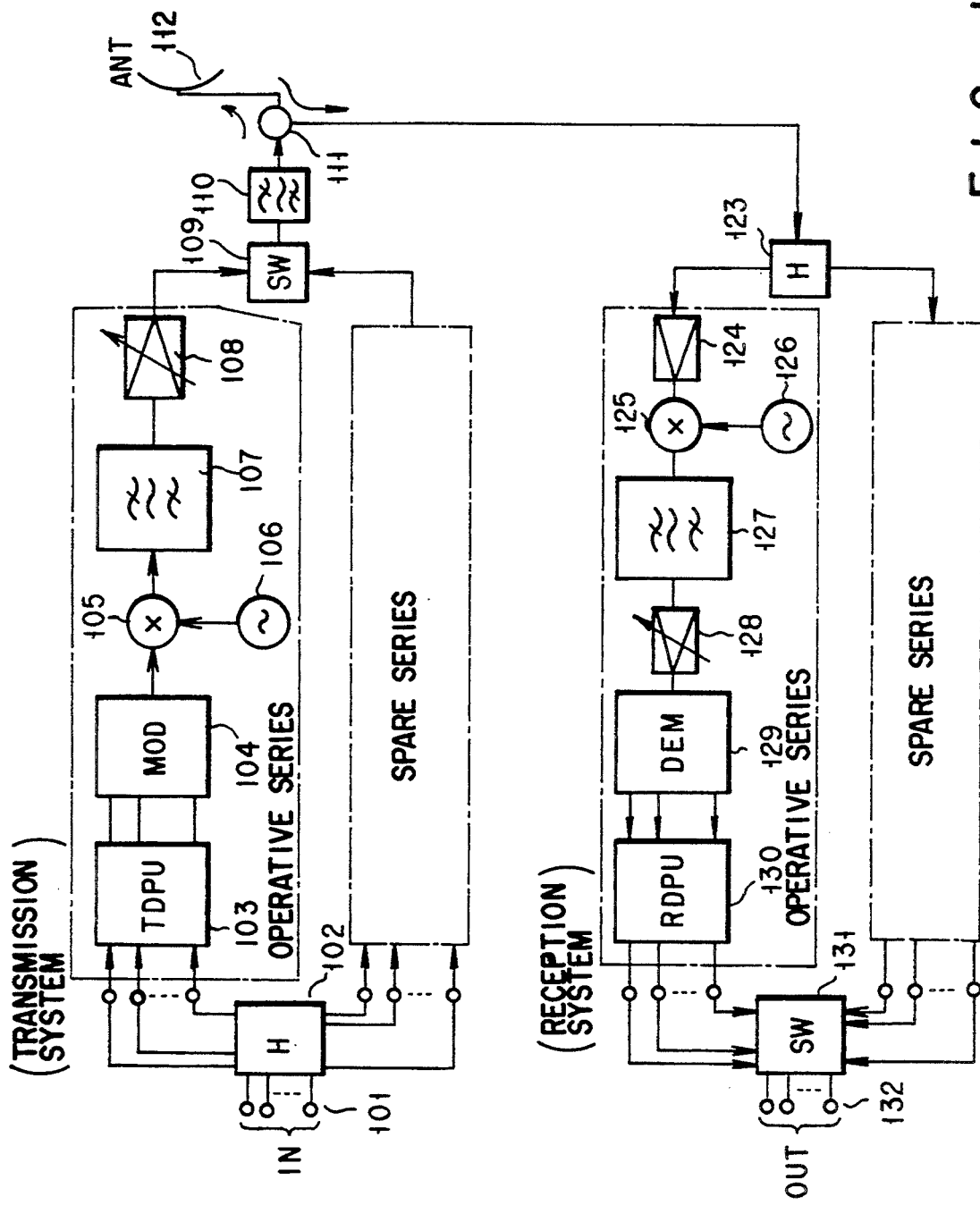
FIG. 1 is a diagram showing one embodiment of this invention and is a block diagram showing the whole construction of a system.

FIG. 1 is a block diagram showing a digital radio communication device according to one embodiment of this invention. The device shown in FIG. 1 is a set spare system having two-series radio devices.

Each two-series radio device has two radio devices one of which is used as an operative series, and the other of which is provided as a spare series. If one of the two radio devices is in trouble or checked for maintenance, then the other radio device can be set into the operative state.

The communication device has a transmission system and a reception system, and as shown in FIG. 1, the transmission system includes input terminals 101, signal distributor (hybrid circuit) 102, transmission digital signal processing circuit 103, modulation circuit 104, frequency converter 105, local oscillator 106, band-pass filter 107, variable gain amplifier 108, switch 109, band-pass filter 110 and distributor 111.

The transmission system has an operative series and a spare series which are separately provided.

The input terminals 101, signal distributor 102, switch 109, band-pass filter 110 and circulator (distributor) 111 are commonly used for the operative series and spare series. Each of circuit sections which are respectively provided for the operative series and spare series includes the transmission digital signal processing circuit 103, modulation circuit 104, frequency converter 105, local oscillator 106, band-pass filter 107 and variable gain amplifier 108.

Signal input terminals 101 are respectively provided for a plurality of series. According to the invention, the transmission system may have only one input terminal provided for one series.

The signal distributor 102 distributes a transmission signal input from the signal input terminal 101 into the operative series and spare series. The transmission digital signal processing circuit 103 is a circuit for subjecting the transmission signals for respective series supplied via the signal distributor 102 to digital signal processing including signal-multiplexing and addition of redundant bits.

The modulation circuit 104 is a circuit for modulating an output of the transmission digital signal processing circuit 103 (for example, by use of the quadrature conversion modulation such as 16 QAM) and outputting the same, and includes an error-correction generator and is constructed to add an error correction code to an output of the transmission digital signal processing circuit 103 and then modulate and output the code added output. With this construction, the error correction decoding process can be effected in the reception side.

A section formed of the frequency converter 105, local oscillator 106, band-pass filter 107 and variable gain amplifier 108 constitutes a microwave transmission circuit and converts a signal modulated by the modulation circuit 104 into a microwave signal and outputs the same. That is, an A.C. signal of preset frequency is generated in the local oscillator 106 and the frequency converter 105 mixes the A.C. signal from the local oscillator 106 with an output signal from the modulation circuit 104. The band-pass filter 107 filters an output from the frequency converter 105 and the variable gain amplifier 108 amplifies an output of the band-pass filter 107 to a desired signal level and outputs the same.

The switch 109 is a selection switch for selecting one of outputs of the operative series and spare series and the band-pass filter 110 subjects an output supplied via the switch 109 to the band-pass filtering process. The circulator 111 supplies an output from the transmission system to an antenna 112 and supplies a signal received by the antenna 112 to the reception systems. The signal passing through the band-pass filter 110 is supplied to the antenna 112 via the circulator 111 and transmitted from the antenna 112.

The reception system includes a signal distributor (hybrid circuit) 123, amplifier 124, frequency converter 125, local oscillator 126, band-pass filter 127, variable gain amplifier 128, demodulation circuit 129, reception digital signal processing circuit 130, switch 131 and output terminal 132.

The signal distributor 123 distributes a reception signal supplied via the circulator 111 into the operative series and spare series of the reception system. A signal received by the antenna 112 is supplied to the distributor 111 which in turn distributes the signal to the reception system.

The amplifier 124 amplifies a signal from the signal distributor 123. The local oscillator 126 generates an A.C. signal of preset frequency and the frequency converter 125 multiplies the signal from the local oscillator 126 with a signal from the amplifier 124 to derive a difference therebetween.

The band-pass filter 127 subjects the output of the frequency converter 125 to the band-pass filtering process and the variable gain amplifier 128 amplifies the output of the band-pass filter 127 to a desired signal level. The demodulation circuit 129 demodulates a signal output from the variable gain amplifier 128 and outputs a demodulated signal. The reception digital signal processing circuit 130 is a circuit for subjecting the demodulated output from the demodulation circuit 129 to a preset digital signal processing.

In the reception system, two circuit series each including the signal distributor (hybrid circuit) 123, switch 131 and output terminal 132 are commonly used for the operative series and spare series. Two circuit series each formed of the amplifier 124, frequency converter 125, local oscillator 126, band-pass filter 127, variable gain amplifier 128, demodulation circuit 129 and reception digital signal processing circuit 130 are provided, one circuit series is used for the operative series and the other circuit series is used for the spare series.

The switch 131 is a selection switch for selecting an output of the reception digital signal processing circuit 130 in one of the operative series and spare series and the output terminal 132 is used for permitting an output of the reception digital signal processing circuit 130 supplied via the switch 131 to be supplied to the exterior.

As described above, the demodulation circuit 129 demodulates and outputs a signal output from the variable gain amplifier 128 and effects the synchronous detection for demodulation and the detected output is identified by an identifying device to derive identification data. The identification data is subjected to the logical process by a logic circuit and converted into demodulation data.

The demodulation circuit 129 restores the reception signal into an original transmission signal (created by adding an error correction code to a data signal), and in this restoring operation (that is, demodulating operation), the decoding process for the error correction code is effected. In order to restore the original transmission signal, the demodulation circuit 129 synchronously detects an input signal and restores the same into in-phase and quadrature-phase base band signal components. The in-phase and quadrature-phase base band signal components are identified by the identifying unit and converted into identification data of in-phase and quadrature-phase. The identification data items, which have been subjected to the addition at the time of transmission, become difference data items as they are subjected to a differential process. The difference data items are decoded and corrected in the error correction circuit. The data, thus demodulated by the demodulation circuit 129 is supplied to the reception digital signal processing circuit 130. The circuit 130 performs signal processes, such as removal of redundant bits, on the data. Thereafter, the data is divided into decoded reception signals, which are supplied via the switch 131 to the signal output terminal 132.

With the construction described above, a transmission data item or transmission data items, are input to the signal input terminal 101. A transmission clock CLK is reproduced from each input signal is used for the synchronization of that input signal. Using this transmission clock CLK, the input signal is written into the memory. The signal is read from the memory in synchronism with the clock which is synchronous with the transmission clock generated in the reception digital signal processing circuit 130.

The signals are input to the transmission digital signal processing circuit 103 via the signal distributor 102. The transmission digital signal processing circuit 103 effects the preset digital signal processing for the input data in synchronism with the transmission clock. An output of the transmission digital signal processing circuit 103 is supplied to the modulation circuit 104. In the modulation circuit 104, after an error correction code is added to the output of the transmission digital signal processing circuit 103, the output is subjected to the quadrature modulation and supplied to the frequency converter 105. The frequency converter 105 receives an A.C. signal (A.C. signal of carrier frequency) of a preset frequency generated from the local oscillator 106 and mixes the A.C. signal from the local oscillator 106 with an output signal of the modulation circuit 104. The band-pass filter 107 filters the output of the frequency converter 105 and the variable gain amplifier 108 amplifies a signal output from the band-pass filter 107 to a corresponding signal level and outputs the amplified signal. The output signal of the amplifier 108 is supplied to the filter 110 via the switch 109, subjected to the band-pass filtering process, and then supplied to the antenna 112 via the distributor 111. Then, the signal is transmitted from the antenna 112 to a target station.

On the other hand, a transmission signal from the target station is received by the antenna 112. The received signal is input to the amplifier 124 via the distributor 111 and signal distributor (hybrid circuit) 123. The received signal is amplified by the amplifier 124 and then supplied to the frequency converter 125. The frequency converter 125 receives an A.C. signal (A.C. signal of of frequency approximately equal to the carrier frequency) generated from the local oscillator 126 and mixes the A.C. signal with the reception signal from the amplifier 124 to derive a signal component. An output of the frequency converter 125 is filtered by the band-pass filter 127, amplified by the variable gain amplifier 128 and then supplied to the demodulation circuit 129. The demodulation circuit 129 demodulates the signal output from the variable gain amplifier 128, subjects the signal to the error correction decoding process, and outputs the signal to the reception digital signal processing circuit 130. The reception digital signal processing circuit 130 effects a preset digital signal processing such as separation of added bits for the demodulated output from the demodulation circuit 129 and distributes outputs to respective series. Data items distributed for respective series are supplied to the output terminals 132 via the switch 131.

The operation of the system with the construction of FIG. 1 is schematically explained above.

The first embodiment of this invention relates to the demodulation circuit 129 of the reception system of the digital radio communication device and is featured in that the synchronizing system in the demodulation circuit 129 is controlled in a specified manner. The explanation is made with much attention paid to this point.

Figure 2:
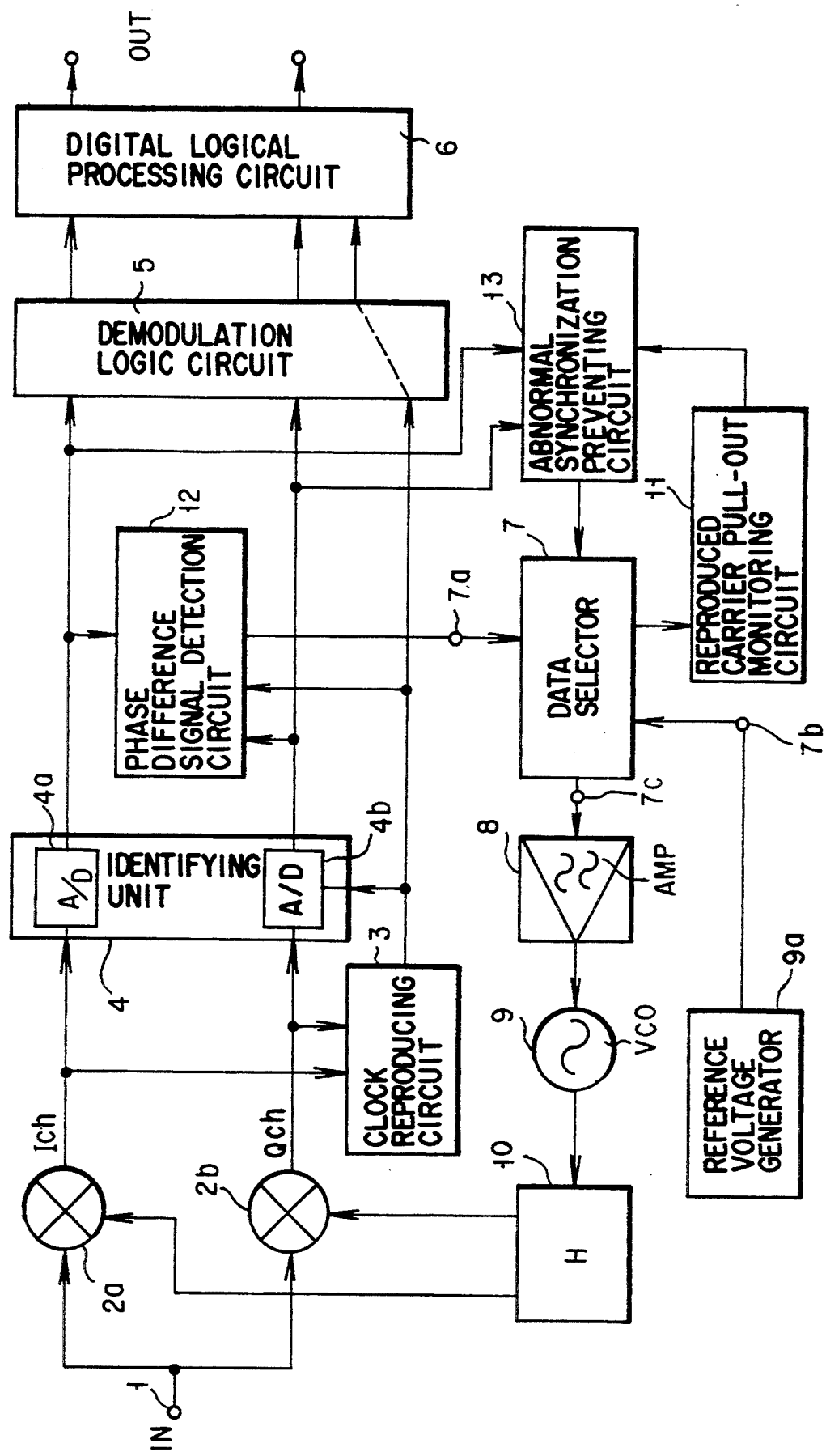
FIG. 2 is a diagram showing one embodiment of this invention and is a block diagram showing the detail construction of a demodulation circuit of FIG. 1.

FIG. 2 is a block diagram showing a main portion of the first embodiment of this invention.

As shown in FIG. 2, the demodulation circuit 129 includes an IF modulated wave input terminal 1, mixers 2a and 2b, clock reproducing circuit 3, identifying unit 4, demodulation logic circuit 5, data selector 7, amplifier 8 with loop filter, voltage-controlled oscillator 9, 90° power distributor 10, reproduced carrier pull-out monitoring circuit 11, phase difference signal detecting circuit 12, and abnormal synchronization preventing circuit 13. A digital logical operation unit 6 is provided in the reception digital signal processing circuit 130.

A modulated IF (intermediate frequency) signal is input to the IF modulated wave input terminal 1 from the variable gain amplifier 128 of the reception system. The input signal is supplied to the mixers 2a and 2b. The mixers 2a and 2b multiply the modulated IF signals input via the IF modulated wave input terminal 1 with an output of the 90° power distributor 10 and output multiplied signals.

The identifying unit 4 is constructed by analog/digital converters (A/D converters) and converts signals input from the mixers 2a and 2b into digital signals and outputs the same. The 90° power distributor 10 gives a 90° phase difference to the carrier wave (reproduced carrier wave) to create and output two-series signals having a different phase from each other. In practice, the 90° power distributor 10 gives a 90° phase difference to the oscillation output of the voltage-controlled oscillator 9 to create a signal which is in phase with the oscillation output and a signal which has a 90° phase difference with respect to the oscillation output. The mixer 2a is supplied with one of the outputs of the 90° power distributor 10 whose phases are different by 90° from each other and the mixer 2b is supplied with the other output, and the mixers 2a and 2b mix the received outputs with the respective modulated IF signals supplied from the input terminal 1 to derive and output difference signals.

Now, assume that an output of the mixer 2a is called an I-ch (I-channel) output and an output of the mixer 2b is called a Q-ch (Q-channel) output.

The clock reproducing circuit 3 receives the I-ch and Q-ch outputs, reproduces a transmission clock signal from the received outputs and outputs the same, and one of the A/D converters of the identifying unit 4 is operated in synchronism with a clock signal (two-multiplied clock pulse) having a frequency twice the frequency of a clock signal output from the clock reproducing circuit 3 to convert the I-ch output into digital data.

The other A/D converter of the identifying unit 4 is operated in synchronism with a clock signal (two-multiplied clock pulse) having a frequency twice the frequency of a clock signal output from the clock reproducing circuit 3 to convert the Q-ch output into digital data.

One of the A/D converters of the identifying unit 4 is supplied with a demodulated base band signal of I-ch series and the other A/D converter thereof is supplied with a demodulated base band signal of Q-ch series, and the A/D converters convert the demodulated base band signals into digital signals in synchronism with the received clock signals and separately output 3-series identifying data items SI1, SI2 and SI3, and SQ1, SQ2 and SQ3 for the I-ch series and Q-ch series (in the case of 4 PSK).

Figure 3:
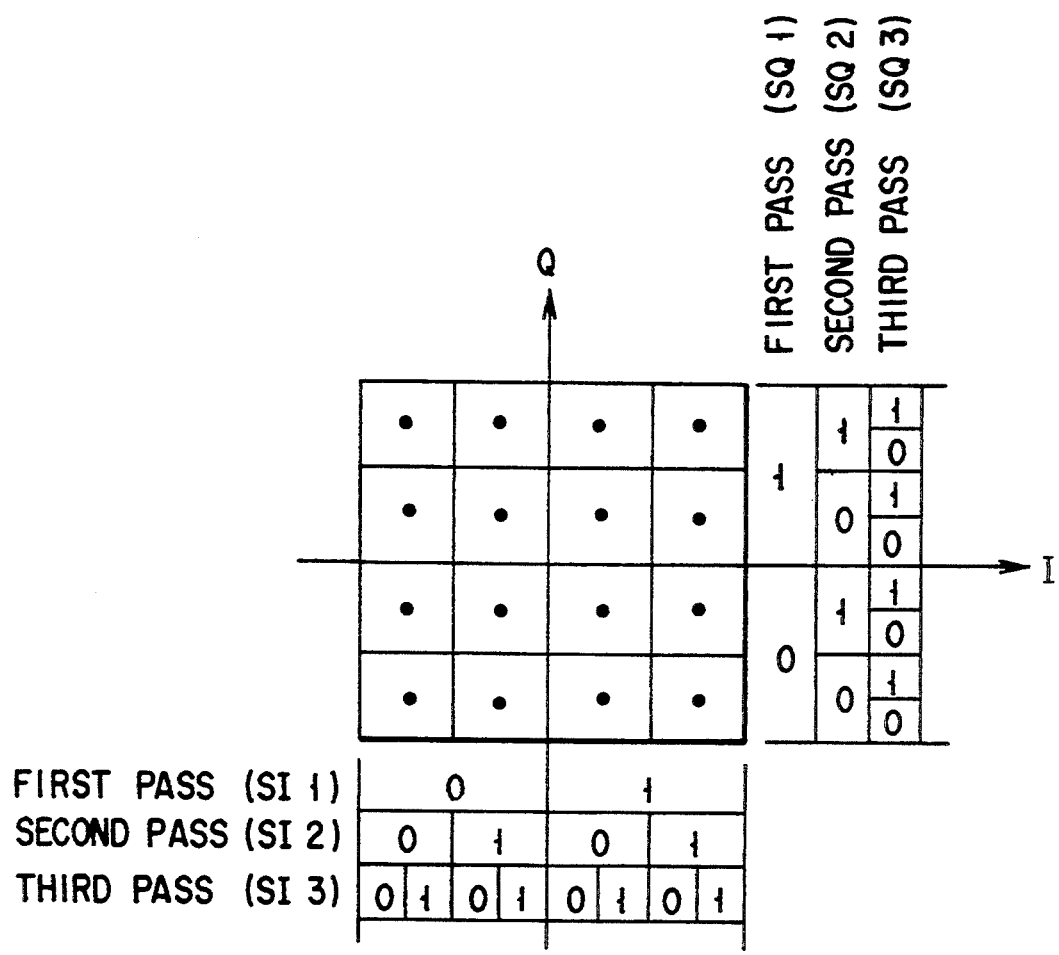
FIG. 3 is a diagram for illustrating identification data.

Assume now that the I channel is set on the horizontal axis of the orthogonal axes in FIG. 3 and the Q channel is set on the vertical axis of the orthogonal axes. In this condition, the identification data SI1 is set to "1" or "0" according to whether data lies in the first or second quadrant of the data phase plane defined by the orthogonal axes I and Q or data lies in the third or fourth quadrant, for example. The identification data SI2 is set to "1" or "0", for example, according to whether data lies in the upper half areas of the first and second quadrants or the third and fourth quadrants or data lies in the lower half areas thereof. Further, the identification data SI3 is set to "1" or "0", for example, according to whether data lies in the upper half portions of the respective halved areas or data lies in the lower half portions thereof.

The identification data SQ1 is respectively set to "1" or "0" when data lies in the first or fourth quadrant or when data lies in the second or third quadrant. The identification data SQ2 is set to "1" or "0", for example, according to whether data lies in the right half areas of the first and fourth quadrants or the second and third quadrants or data lies in the left half areas thereof. Further, the identification data SQ3 is set to "1" or "0", for example, according to whether data lies in the right half portions of the respective halved areas or data lies in the left half portions thereof.

With the above division, an area in which the signal appears can be determined and each area can be set to correspond to an output (output of each bit position) for each resolution of the A/D converter which can be derived by converting signal levels on the I and Q axes into digital signals. Thus, data derived by converting the I- and Q-channel components into digital signals by means of the A/D converters can be used as identification data.

The demodulation logic circuit 5 receives the identification data SI1, SI2, SI3, SQ1, SQ2 and SQ3, processes the identification data to derive demodulation data of the I- and Q-channel components, and outputs the thus derived demodulation data to the digital logical operation unit 6. The identification data items SI1 and SQ1 are called first-pass identification data, the identification data items SI2 and SQ2 are called second-pass identification data, and the identification data items SI3 and SQ3 are called third-pass identification data as required.

The data selector 7 outputs a phase difference signal in the normal synchronization state at the time of synchronous detection (when synchronization for the synchronous detection is set up by a reproduced carrier having a frequency equal to the original carrier frequency) and outputs a preset reference bias signal in the abnormal synchronization state (when synchronization for the synchronous detection is set up by a reproduced carrier having a frequency different from the original carrier frequency), and selectively outputs one of the signals according to an abnormal synchronization detecting signal output from the abnormal synchronization preventing circuit 13.

Thus, the data selector 7 is so constructed as to receive the phase difference signal and reference bias signal, select the reference bias signal while receiving the abnormal synchronization detecting signal and select and output the phase difference signal when the abnormal synchronization detecting signal is not received.

The phase difference signal is derived by processing the identification data items SI1, SI2, SI3, SQ1, SQ2 and SQ3 output from the identifying unit 4 to derive carrier phase information and converting the carrier phase information into a voltage signal of corresponding level, and this function is realized by the phase difference signal detecting circuit 12.

The reference bias signal is a signal output from a reference voltage generator 9a and the level thereof is set to a voltage level with which the voltage-controlled oscillator (VCO) 9 can be oscillated at a predetermined reference carrier frequency.

The amplifier 8 with loop filter amplifies the level of a signal output from the data selector 7.

Further, the VCO 9 generates a signal of frequency corresponding to the level of a signal whose level corresponds to carrier phase information derived from the amplifier 8 with loop filter and supplies the signal as a reproduced carrier signal to the 90° power distributor 10.

The 90° power distributor 10 causes a 90° phase difference in the reproduced carrier signal to derive two reproduced carrier signals, that is, the original reproduced carrier signal and the reproduced carrier signal having the phase difference. Then, the 90° power distributor 10 supplies the two reproduced carrier signals to the respective mixers 2a and 2b as local signals. Thus, the carrier wave can be eliminated and data can be demodulated by supplying the reproduced carrier signals having a 90° phase difference from each other to the mixers 2a and 2b as local signals and multiplying them with a signal from the input terminal 1.

The reproduced carrier pull-out monitoring circuit 1 monitors the pull-out of the carrier and generates an alarm signal (pull-out alarm signal) when the pull-out is detected and thus monitors the pull-out of the carrier by monitoring the content of an output of the identifying unit 4.

The phase difference signal detecting circuit 12 is a circuit for generating a phase difference signal indicating the phase difference between the frequency of the original carrier wave and the frequency of the reproduced carrier wave. As described before, the phase difference signal is derived by processing the identification data items SI1, SI2, SI3, SQ1, SQ2 and SQ3 output from the identifying unit 4 to derive carrier phase information and converting the carrier phase information into a voltage signal of corresponding level. Further, the reference bias signal is derived from the reference voltage generator 9a.

When the identification data has a predetermined abnormal value, the abnormal synchronization preventing circuit 13 detects an abnormal synchronization. At this time, if the abnormal synchronization preventing circuit 13 receives no pull-out alarm signal, if it outputs the abnormal synchronization detecting signal during a predetermined time period and supplies it to the data selector 7.

In FIG. 2, an element indicated by a reference numeral 7a is a phase difference signal input terminal of the data selector 7 which is a terminal for receiving a phase difference signal, an element indicated by a reference numeral 7b is a reference bias signal input terminal which is a terminal for receiving a reference bias signal, and an element indicated by a reference numeral 7c is a carrier reproducing circuit controlling signal output terminal which is a terminal for outputting a carrier reproducing circuit controlling signal supplied to the VCO side.

Next, the operation of the demodulation system of the above construction is explained. An IF modulated wave input from the IF modulated wave input terminal 1 is detected by the mixers 2a and 2b and converted into a demodulated base band signal. A clock signal is generated from the clock reproducing circuit 3 and the identifying unit 4 identifies the demodulated base band signal at the synchronized timing in synchronism with the clock signal and creates identification data.

The identification data is supplied to the demodulation logic circuit 5 which in turn logically processes the identification data to derive demodulation data. The thus derived demodulation data is set in frame-synchronization in the digital logical processing circuit 6 and output therefrom.

Further, the phase difference signal detecting circuit 12 of the carrier reproducing system detects carrier phase difference information from identification data output from the identifying unit 4 and supplies the same as a carrier phase difference signal from the phase difference signal input terminal 7a to the data selector 7. The data selector 7 supplies the carrier phase difference signal to the amplifier 8 with loop filter in the normal synchronization state. The amplifier 8 with loop filter amplifies the difference information signal and supplies the amplified signal to the voltage-controlled oscillator 9 which in turn oscillates at an oscillation frequency corresponding to the difference information signal to generate a reproduced carrier wave synchronized with the carrier clock.

The reproduced carrier wave from the voltage-controlled oscillator 9 is supplied to the 90° power distributor 10 which causes a 90° phase difference in the reproduced carrier wave to create two reproduced carrier waves which are respectively in phase with and deviated by 90° from the original reproduced carrier wave. The two reproduced carrier waves are respectively supplied to the mixers 2a and 2b as local inputs. The mixers 2a and 2b mix the local inputs with the reception signal from the input terminal 1 to detect the same.

The reproduced carrier pull-out monitoring circuit 11 monitors the pull-out of the carrier wave and outputs an alarm signal when the pull-out is detected.

The abnormal synchronization preventing circuit 13 generates an output only when the pull-out alarm signal (carrier pull-out alarm signal) is not generated from the reproduced carrier pull-out monitoring circuit 11 and the abnormal synchronization is detected so that erroneous determination of the carrier pull-out and the abnormal synchronization can be prevented.

Thus, if the abnormal synchronization is detected when no pull-out alarm signal is generated, that is, when the carrier wave is synchronized, an abnormal synchronization detecting signal is generated from the abnormal synchronization preventing circuit 13 for a preset period of time and supplied to the select signal input terminal of the data selector 7.

As described above, the data selector 7 supplies the phase difference signal input from the phase difference signal input terminal 7a to the carrier reproducing circuit controlling signal output terminal 7c in the normal synchronization state (that is, when no abnormal synchronization is detected) and permits the phase difference signal to be supplied to the succeeding stage voltage-controlled oscillator (VCO) 9 via the amplifier 8 with loop filter, and a reference carrier wave is reproduced from the VCO 9.

Assume now that an abnormal synchronization state in which the synchronization state is set up by a reproduced carrier wave of a frequency different from the original carrier frequency (carrier clock) occurs. By the set-up of the abnormal synchronization state, an abnormal synchronization detecting signal is output from the abnormal synchronization preventing circuit 13 and input to the select terminal of the data selector 7. In response to the above input, the data selector 7 selects the input position of the reference bias signal input terminal 7b so as to permit a preset reference bias signal input to the reference bias signal input terminal 7b to be output from the carrier reproducing circuit controlling signal output terminal 7c.

The reference bias signal is amplified by the amplifier 8 with loop filter and then supplied to the VCO 9 as a reference voltage so that the VCO 9 may oscillate at a frequency corresponding to the reference bias signal.

The reference bias signal is a signal output from the reference voltage generator 9a, and since the level thereof is set to a voltage level with which the voltage-controlled oscillator (VCO) 9 can oscillate at the reference carrier frequency, the voltage-controlled oscillator 9 will oscillate at the reference carrier frequency (frequency close to the carrier frequency on the transmission side). However, since no phase difference information is provided, the carrier pull-out may occur.

After a preset period of time has passed and when generation of the abnormal synchronization detecting signal from the abnormal synchronization preventing circuit 13 is interrupted, the data selector 7 switches the input position from the reference bias signal input terminal 7b to the phase difference signal input terminal 7a. Therefore, the data selector 7 permits the phase difference signal input via the phase difference signal input terminal 7a to be output from the carrier reproducing circuit controlling signal output terminal 7c and supplied to the VCO 9 so as to start the pull-in operation.

Since the system is operated by the reference carrier wave of a frequency which is extremely close to the frequency of the original carrier wave generated by the reference bias voltage until the pull-in operation is started, the pull-in operation is started from the frequency of the reference carrier wave.

Thus, since the carrier reproducing loop starts the pull-in operation in such a condition that the operation frequency is set to the frequency which is extremely close to the frequency of the reference carrier wave and determined by the reference bias signal at the time of abnormal synchronization, no abnormal synchronization occurs and normal synchronization can be attained.

Next, a specific embodiment of the abnormal synchronization preventing circuit 13 used in this invention is explained with reference to FIG. 4.

Figure 4:
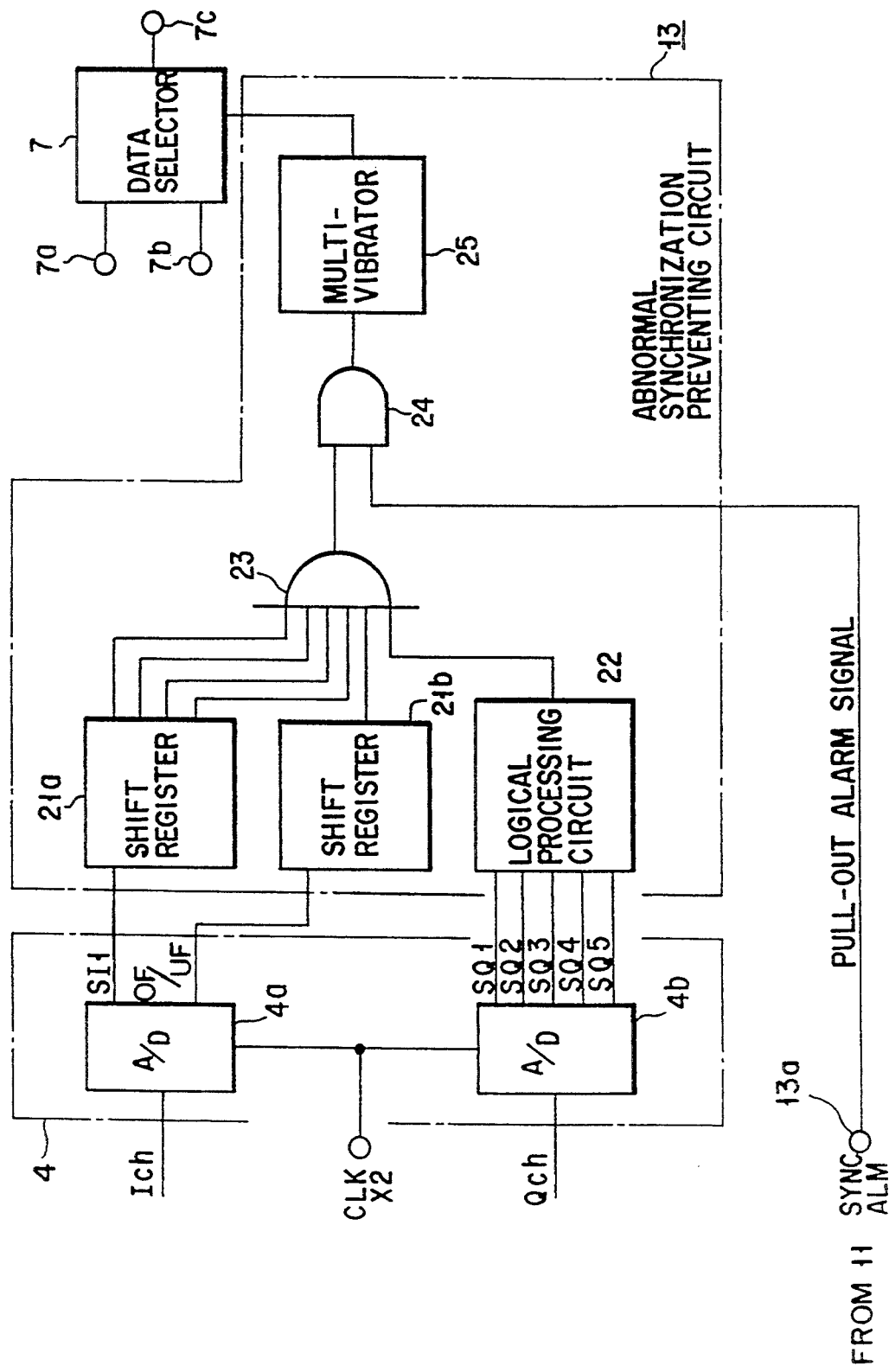
FIG. 4 is a diagram showing one embodiment of this invention and is a circuit diagram showing the detail construction of an abnormal synchronization preventing circuit of FIG. 2 together with peripheral circuits thereof.

As shown in FIG. 4, the identifying unit 4 and the data selector 7 are respectively provided in the preceding and succeeding stages of the abnormal synchronization preventing circuit 13. The identifying unit 4 is constructed by A/D converters 4a and 4b. The A/D converters 4a and 4b are operated in response to a clock signal (two-multiplied clock pulse) CLK×2 having a frequency twice that of a clock signal output from the clock reproducing circuit 3. The data selector 7 includes a phase difference signal input terminal 7a for receiving a phase difference signal, a reference bias signal input terminal 7b for receiving a reference bias signal, and a carrier reproducing circuit controlling signal output terminal 7c for outputting a carrier reproducing circuit controlling signal to the amplifier 8. That is, the data selector 7 is a selection switch for selecting one of the phase difference signal and reference bias signal and outputting the selected signal from the carrier reproducing circuit controlling signal output terminal 7c.

The peripheral circuit portion of the abnormal synchronization preventing circuit 13 according to this invention has been described above. The abnormal synchronization preventing circuit 13 according to this invention is constructed by shift registers 21a and 21b, logical processing unit 22, AND circuits 23 and 24, and multivibrator 25. In the drawing, an element indicated by a reference numeral 13a is an input terminal for the pull-out alarm signal, and the input terminal 13a receives the pull-out alarm signal from the reproduced carrier pull-out monitoring circuit 11.

The A/D converter 4a in the identifying unit 4 has an output terminal for overflow (OF)/underflow (UF) and may generate an overflow/underflow output in response to an input exceeding the range between the quantized upper and lower limits.

If the A/D converter 4a is used to identify identification data of I-ch (channel) and the A/D converter 4b is used to identify identification data of Q-ch, the shift register 21a sequentially shifts an output SI1 of first pass (highest order digit) among the identification data of the A/D converter 4a and the shift register 21b sequentially shifts an overflow/underflow output (OF)/(UF) among the identification data of the A/D converter 4a.

The A/D converters 4a and 4b are operated by a clock having a frequency twice that of the two-multiplied clock signal CLK of the reproducing clock signal. Therefore, the data identifying the demodulation eye pattern of a data signal, which has been obtained at the timing of generating a clock pulse, and the data identifying the demodulation eye pattern obtained at the midpoint of the carrier synchronization cycle are produced alternately. The shift register 21a outputs four bits starting from the least significant bit in order to monitor the successive four bits for the first-pass output SI1 among the identification data of the A/D converter 4a. Further, the shift register 21b outputs the third bit from the least significant bit position in order to derive the overflow/underflow output (OF)/(UF) among the identification data of the A/D converter 4a as identification data obtained at a timing which is deviated by a time of three bits.

The logical processing unit 22 logically processes an output (in this example, identification data items SQ1 to SQ5 from the first pass (most significant bit output) to the fifth pass (bit output in the fifth bit position from the most significant bit position)) of the A/D converter 4b for identifying Q-ch identification data so as to detect abnormal synchronization according to whether or not a signal is detected in an abnormal synchronization detecting area AN in the phase plane which will be described later, and when the abnormal synchronization is detected (a signal is detected in the abnormal synchronization detecting area AN), it generates an output signal.

The AND circuit 23 derives the logical AND of an output signal of the logical processing unit 22, a signal of four bits output from the shift register 21a and a signal of the third bit output from the shift register 21b.

The logical processing unit 22 receives an identification data output of the A/D converter 4b for Q channel and is used to detect a signal in the abnormal synchronization detecting area AN as viewed from the Q channel side. Further, the shift register 21a is provided to determine whether the condition for monitoring abnormal synchronization is set up (a signal is stably present) or not based on the output thereof and the shift register 21b is provided to output an output of signal detection in the abnormal synchronization detecting area AN as viewed from the I channel side with time lag.

Thus, whether or not a signal is detected in the abnormal synchronization detecting area AN can be determined in a state in which the condition for monitoring the abnormal synchronization is satisfied by deriving the logical AND of an output of the logical processing circuit 22, a signal of four bits output from the shift register 21a and a signal of the third bit output from the shift register 21b by use of the AND circuit 23.

Further, the AND circuit 24 derives the logical AND of an output of the AND circuit 23 and the carrier pull-out alarm signal output and permits the output of the AND circuit 23 to be supplied to the multivibrator 25 when no carrier pull-out occurs.

The multivibrator 25 is operated in response to the output of the AND circuit 24 to generate a signal ("L" level) for a preset period of time.

A signal output from the multivibrator 25 is supplied to the select signal input terminal of the data selector 7 as a selection signal at the time of detection of abnormal synchronization, thus causing the data selector 7 to effect the selecting operation.

The data selector 7 outputs a phase difference signal supplied from the phase difference signal input terminal 7a from the carrier reproducing circuit controlling signal output terminal 7c and supplies the same to the succeeding-stage voltage-controlled oscillator (VCO) 9 in the normal operation state, and when the abnormal synchronization detecting signal is output from the multivibrator 25, the data selector 7 outputs a reference bias supplied from the reference bias signal input terminal 11 from the carrier reproducing circuit controlling output terminal 7c. The reference bias signal is generated from the voltage-controlled oscillator 9.

The carrier pull-out alarm signal is an alarm signal output from the reproduced carrier pull-out monitoring circuit 11 at the time of occurrence of reproduced carrier pull-out.

With the above construction, the A/D converters 4a and 4b constituting the identifying unit 4 are operated in response to a two-multiplied clock signal CLK×2 of the reproducing clock signal to convert signal from the mixers 2a and 2b into corresponding digital signals.

As a result, a data level (data determined by use of the demodulation eye pattern) at the signal point of data as viewed on the phase plane and a data level (data determined by use of the demodulation eye pattern) at a transition point to the next data are alternately output from the A/D converters 4a and 4b. The shift register 21a converts serial data into parallel data. The first-pass output SI1 among the identification data of the A/D converter 4a is input to the shift register 21a. Every adjacent from bits of the output SI1 are converted into a 4-bit parallel form, which is input to the AND circuit 23.

Four bits starting from the least significant bit position are used as an output of the shift register 21a so as to monitor successive four bits of the first-pass output SI1 among the identification data of the A/D converter 4a.

Further, in order to derive an output (OF)/(UF) of overflow/underflow of the identification data of the A/D converter 4a as identification data obtained at a timing deviated by a time of three bits, the shift register 21b supplies an output of the output terminal at a third bit position from the least significant bit position to the AND circuit 23.

The logical processing unit 22 logically processes an output [in this example, identification data items SQ1 to SQ5 from the first pass (most significant bit output) to the fifth pass (bit output in the fifth bit position from the most significant bit position)] of the A/D converter 4b for identifying Q-ch identification data so as to determine abnormal synchronization when a signal is detected in the abnormal synchronization detecting area AN in the phase plane which will be described later, and supplies an output signal to the AND circuit 23.

Thus, at the time of occurrence of abnormal synchronization, an output is generated from the AND circuit 23.

Figure 5:
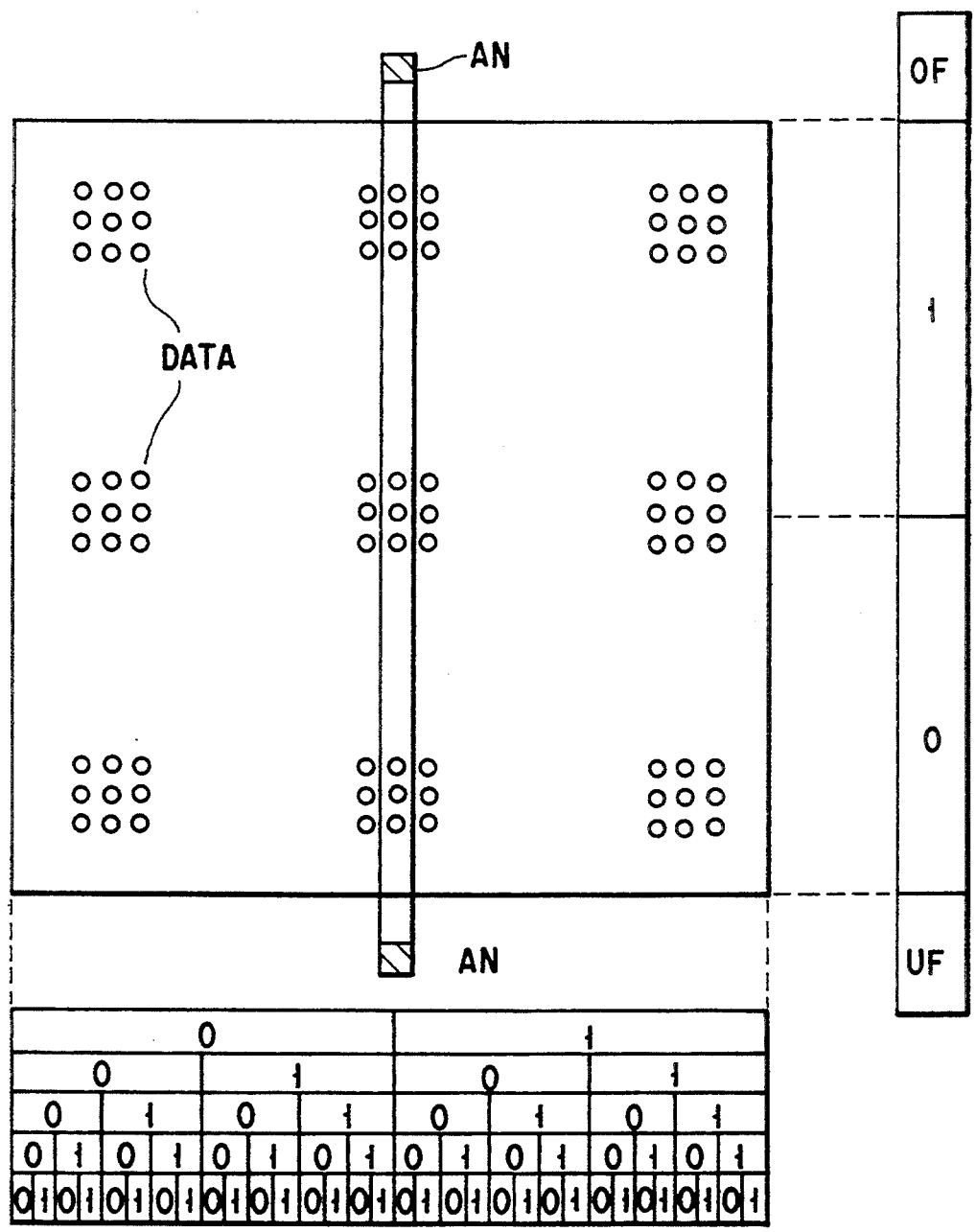
FIG. 5 is a diagram for illustrating the operation of this invention and is a diagram showing the constellation (phase plane) at an intermediate point between synchronized points obtained in a case where a demodulated signal at the time of normal synchronization is sampled by a two-multiplied clock.

FIG. 5 shows the constellation (phase plane signal arrangement) of reception data (the signal level of the reception data on the phase plane) represented by the demodulation eye pattern. FIG. 5 shows the constellation at intermediate points between carrier clock synchronization points set when the data is sampled by the two-multiplied clock in the normal synchronization state.

In FIG. 5, AN indicates an abnormal synchronization detecting area defined for detecting abnormal synchronization.

Figure 6:
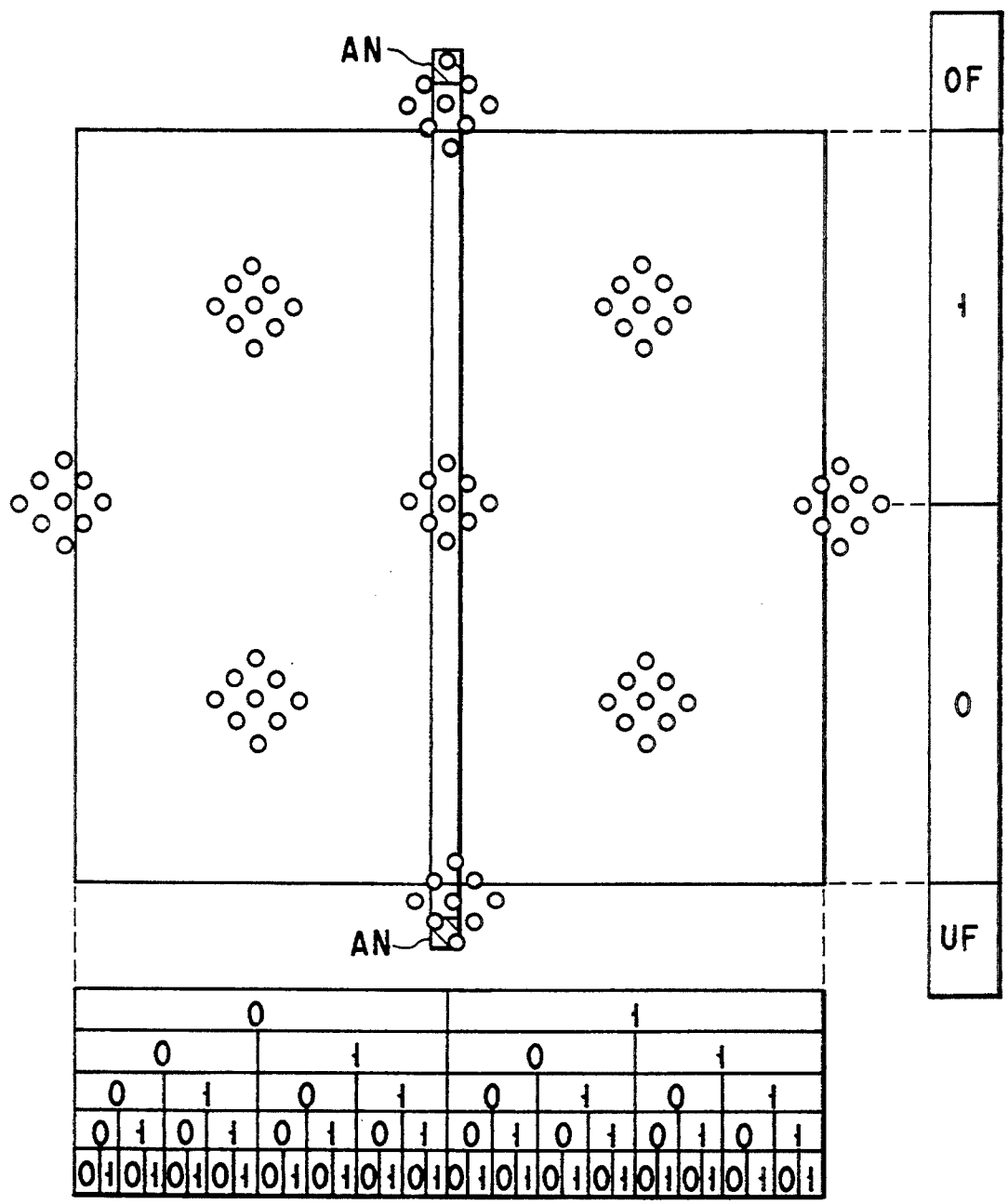
FIG. 6 is a diagram showing the constellation (phase plane) at an intermediate point between synchronized points obtained in a case where a demodulated signal at the time of abnormal synchronization is sampled by a two-multiplied clock.

FIG. 6 shows the constellation of a signal level of the reception data on the phase plane as an example of a case of the abnormal synchronization. The constellation is at a transition point of data obtained when a signal of reception data is sampled by the two-multiplied clock of the carrier clock. Like the case of FIG. 5, AN indicates an abnormal synchronization detecting area.

In the quadrature amplitude modulation system (including 4 PSK), the synchronized phase is always set to one of $\pi/4$, $3\pi/4$, $5\pi/4$ and $7\pi/4$ ($\pi$ is the ratio of the circumference of a circle to its diameter) in the phase plane when the synchronous detection is effected by the carrier wave and the constellation (phase plane signal arrangement) at an intermediate point in time between data items shown in FIG. 5 can be obtained in the case of normal synchronization.

This is explained in a simplified manner with reference to FIG. 7. FIG. 7 schematically shows the phase plane as viewed on the time base t in the quadrature amplitude modulation system. Data subjected to the quadrature amplitude modulation appears as correct data at timings of the transmission clock synchronizing point at the time of transmission and a point near the clock synchronizing point, but at other timings, data is in the transition state and the content thereof cannot be stably determined. In this invention, since the sampling is effected even in the intermediate points between the transmission clock synchronizing points, the content of data obtained in an intermediate point in time between data items cannot be stably determined.

However, if the timings of the transmission clock and the sampling point coincide with each other (that is, if the reproduced carrier wave coincides with the carrier wave on the transmission side and is synchronized with the transmission clock), the constellation at an intermediate point in time between data items coincides with the I and Q axes of the phase plane set at the transmission clock synchronizing point, and as shown in FIG. 7, no deviation occurs.

In contrast, when the abnormal synchronization state in which the synchronization state is caused by a carrier wave of a frequency different from the original carrier frequency is set up, the synchronizing phase regularly varies by $\pi/4$ or $\pi/2$ for each data, for example, and twist occurs in the signal in the phase plane. That is, as shown in FIG. 8, the constellation of the intermediate point in time between data items does not coincide with the I and Q axes of the phase plane at the carrier synchronizing point and is rotated in a clockwise or counterclockwise direction and inclined.

That is, a twist occurs. Since the twist coincides with the phase position of data such as $\pi/4$ and $\pi/2$ in every clock cycle, the phase plane is the same as that obtained at a transmission clock synchronizing point in the normal synchronizing case, but the phase plane at an intermediate point in time between the transmission clock synchronizing points is inclined with the I and Q axes rotated in a preset direction by the twist as shown in FIG. 8. As a result, the signal level of data is changed by the inclination of the phase plane.

Therefore, the detection area AN is defined with the above fact taken into consideration, a state set when data is detected in the area AN is defined as the abnormal synchronization state, and the abnormal synchronization is detected under this condition.

In order to achieve the above purpose, the following operation is effected.

As described above, the two-multiplied clock CLK×2 of the transmission clock is input to the A/D converter 4a on the I-channel side and reception data represented by the demodulation eye pattern is sampled also at intermediate points between the points of synchronization with the transmission clock. Then, whether or not the sampled data is detected in the abnormal synchronization detecting area AN is determined. On the reception side, the transmission clock on the transmission side is reproduced as a reproducing clock from the received signal and the reproducing clock is used to attain synchronization at the time of sampling of the reception data.

The first-pass to fifth-pass identification data items SQ1 to SQ5 output from the A/D converter 4b on the Q-channel side are logically processed by the logical processing unit 22. The first-pass identification data item SI1 and sampling data between signal points of the identification data on the I-channel side are sequentially shifted by the shift registers 21a and 21b. As the result of shifting operation, four successive bits of the identification data items SI1 can be monitored and the signal state of the overflow/underflow output (OF)/(UF) in the identification data of the A/D converter 4a set when the output is shifted by three bits (that is, the signal state in the intermediate point corresponding to the timing at which the content of the reception data is set in the transition state) can be monitored.

An output is derived from the AND circuit 24 when an abnormal synchronization detecting signal is generated and no carrier pull-out signal is generated by taking a logical product of the abnormal synchronization detecting signal obtained by supplying the data items to the AND circuit 23 and the carrier pull-out signal in the AND circuit 24, thereby preventing erroneous determination of the carrier pull-out and the abnormal synchronization. The multivibrator 25 is operated in response to the output of the AND circuit 24 to supply an abnormal synchronization detecting signal to the select signal input terminal of the data selector 7 for a preset period of time.

In the normal operation, the data selector 7 outputs a phase difference signal supplied from the phase difference signal input terminal 7a from the carrier reproducing circuit controlling signal output terminal 7c and supplies the same to the succeeding-stage voltage-controlled oscillator (VCO) 9 via the amplifier 8 so as to reproduce a reference carrier wave from the voltage-controlled oscillator 9.

However, when the abnormal synchronization occurs and an abnormal synchronization detecting signal is supplied from the multivibrator 25 of the abnormal synchronization preventing circuit 13 to the select signal input terminal, the data selector 7 changes the input position. As a result, the data selector 7 outputs a reference bias signal supplied from the reference bias signal input terminal 7b from the carrier reproducing circuit controlling signal output terminal 7c instead of the phase difference signal.

Since the reference bias signal is generated from the reference voltage generator 9a whose output level is set to permit the voltage-controlled oscillator 9 to oscillate at a frequency approximately equal to the reference carrier frequency, the voltage-controlled oscillator 9 will oscillate at the frequency approximately equal to the reference carrier frequency. However, since no phase difference information is provided, the carrier pull-out may occur.

Since, after a preset period of time, generation of an output from the multivibrator 25 of the abnormal synchronization preventing circuit 13 is interrupted, the data selector 7 switches the input position to the initial state and outputs a phase difference signal supplied via the phase difference signal input terminal 7a from the carrier reproducing circuit controlling signal output terminal 7c to start the pull-in operation.

At this time, the carrier reproducing loop outputs a reproduced carrier wave of a frequency which is extremely close to the original carrier frequency determined by the reference bias voltage and the the pull-in operation is started from the reproduced carrier frequency. Therefore, no abnormal synchronization occurs and normal synchronization can be attained.

For example, the I and Q channels can be exchanged with each other and it is possible to detect the abnormal state in four areas including the exchanged detecting areas.

Thus, with the carrier reproducing loop of this invention, a reference bias signal which may permit oscillation at a frequency extremely close to the frequency of the reference carrier wave is temporarily used instead of the phase difference signal supplied to the voltage-controlled oscillator in the abnormal synchronization state so as to cause the voltage-controlled oscillator to oscillate according to the reference bias signal, and since the pull-in operation is started from a frequency extremely close to the frequency of the oscillated reference carrier wave, no abnormal synchronization occurs and normal synchronization can be attained.

The above explanation is made by taking a case of 4 PSK as an example, but substantially the same explanation can be made for the 16 QAM, 64 QAM, 256 QAM and the like. For example, in the case of 16 QAM, since each of the I channel and Q channel takes four states and identification data of two bits is used, the demodulation device may be so designed that first-pass and second-pass identification data items (SQ1, SQ2, SI1, SI2) may be used as identification data items output from the A/D converters 4a and 4b of the identifying unit 4 as shown in FIG. 9. Likewise, in the case of 64 QAM, since each of the I channel and Q channel takes eight states and identification data of three bits is used, the demodulation device may be so designed that first-pass to third-pass identification data items (SQ1 to SQ3, SI1 to SI3) may be used as identification data items output from the A/D converters 4a and 4b of the identifying unit 4.

The above embodiment may be summarized as follows. It is used for demodulation of the quadrature amplitude modulation type digital radio device, an oscillator oscillating at an oscillation frequency corresponding to the control signal to generate a reproduced carrier signal is used and two reproduced carrier signals having a 90 degree phase difference are derived from the former reproduced carrier signal. The two reproduced carrier signals are mixed with a reception signal and demodulated base band signals of the I-axis and Q-axis components derived by demodulation are identified to derive identification data. More specifically, the reception signal is mixed with one of the two reproduced carrier signals to create the I-axis demodulated base band signal and the reception signal is mixed with the other reproduced carrier signal to create the Q-axis demodulated base band signal. Then, a phase difference signal is derived based on the identification data items of I-axis and Q-axis components and is supplied as the control signal to the oscillator to control the oscillation of the oscillator. Further, a clock is reproduced from the demodulated base band signal of I-axis and Q-axis components and the reproducing clock is used as the synchronizing signal for sampling the identification data. The above embodiment corresponds to such a demodulation device.

In this system, the monitoring circuit is provided in the above demodulation device and the monitoring circuit is used to monitor the carrier pull-out based on the demodulated base band signal and output a carrier pull-out alarm signal when carrier pull-out occurs. Further, an abnormal synchronization detecting circuit is provided to sample the level (signal level on the phase plane) of the reception data demodulated based on the demodulated base band signal at a speed (twice the transmission speed of reception data) twice the reproducing clock speed and detect phase deviation based on the detection area of the sampled data. That is, the inclination of the I and Q axes in the phase plane is detected to detect the twist of the data, thereby causing the abnormal synchronization detecting circuit to detect the abnormal synchronization. By use of the abnormal synchronization preventing circuit, a signal can be generated for a preset period of time when abnormal synchronization is detected while no carrier pull-out signal is generated.

Further, the selector is provided and a phase difference signal and a reference signal used for generating a signal of reference carrier frequency close to the frequency of the carrier wave are supplied to the selector. The selector is normally set to select the phase difference signal as the control signal and is set to select the reference signal as the control signal while receiving an output signal of the abnormal synchronization preventing circuit and supply the selected signal to the oscillator.

With the above construction, the demodulated base band signal is identified to derive the phase difference signal which is supplied as the control signal to the oscillator so as to cause the oscillator to oscillate at a frequency corresponding to the control signal and generate a reproduced carrier wave, the reproduced carrier wave is subjected to the 90° phase shifting process to derive two reproduced carrier signals having a 90° phase difference from each other, the two reproduced carrier signals are mixed with the reception signal and subjected to the synchronous detection to derive the demodulated base band signals of I-axis and Q-axis components, and reception data is reproduced based on the demodulated base band signals. At this time, if the reproduced carrier wave is deviated from the carrier frequency of the reception signal, the reproduced reception data will contain an error due to the carrier pull-out. Therefore, the oscillation frequency of the oscillator is controlled and adjusted to an optimum value. However, in the case of a signal of low transmission speed, abnormal synchronization in which the reproduced carrier wave is stabilized at a frequency different from the original carrier frequency may occur and data cannot be correctly reproduced.

Therefore, in the device of this invention, the monitoring circuit is used to monitor the carrier pull-out based on the demodulated base band signal and the abnormal synchronization detecting circuit is used to sample the signal level on the phase plane of the reception data demodulated based on the demodulated base band signal at a speed twice the transmission speed of the reception data. Then, the location where the detection area of the sampled data lies in the predetermined area is detected, and phase deviation is detected based on the detected location to detect abnormal synchronization. When the abnormal synchronization is detected and if no carrier pull-out occurs, then the abnormal synchronization preventing circuit generates a signal for a preset period of time. The selector receives the phase difference signal and the reference signal used for generating a signal of reference carrier frequency close to the frequency of the carrier wave and is normally set to select the phase difference signal as the control signal and set to select the reference signal as the control signal while receiving an output signal of the abnormal synchronization preventing circuit and supply the selected signal to the oscillator.

As a result, if abnormal synchronization corresponding to the synchronous detection state set by the reproduced carrier wave of a frequency different from the original carrier frequency occurs, the oscillation of the oscillator is controlled by the reference signal for a preset period of time and then the oscillation of the oscillator is controlled based on the demodulated base band signal by the phase difference signal. However, the oscillation frequency of the oscillator controlled based on the reference signal is approximately equal to the carrier frequency of the reception signal. The demodulating system is set to a state which is extremely close to the correct phase state by effecting the demodulation by use of the reproduced carrier wave of the above frequency and the pull-in operation by the phase difference signal is started from this state so that normal synchronization can be attained.

In this invention, in the the abnormal synchronization detecting circuit, determination of normal synchronization or abnormal synchronization can be made in the demodulated eye pattern by monitoring the level of the reception data in the phase plane (that is, the demodulated eye pattern of the reception data) at intermediate points between the transmission clock synchronized points of data so that abnormal synchronization can be detected in a simplified manner. If the abnormal synchronization is detected and normal synchronization is determined according to the pull-out alarm, then the carrier reproducing loop is temporarily cut off, a reproduced carrier wave having a frequency extremely close to the carrier frequency of the transmission signal is generated and used to demodulate the reception signal for preset period of time, and the transmission clock is reproduced from the demodulated base band signal obtained by the above demodulation and used to start the synchronization control. That is, identification data is derived in synchronism with the reproduced clock and used to effect the phase difference detection, and when a phase difference signal is obtained, the original carrier reproducing loop is restored to attain the normal synchronization. Thus, in this invention, abnormal synchronization can be prevented in the demodulation device of the multiple value quadrature modulation type digital radio device using the Costas type carrier reproducing loop which can be formed with simple construction.

As described above, in this invention, in the demodulation device of the multiple value quadrature modulation type digital radio device using the so-called Costas type carrier reproducing loop, when data is restored by taking synchronization with the reproduced carrier wave which is reproduced from the reception signal and extracting data on the synchronized points, determination of abnormal synchronization and normal synchronization by the carrier wave of normal frequency is made by monitoring the carrier pull-out with respect to the reproduced carrier wave of the same frequency as the carrier wave and the abnormal synchronization corresponding to the synchronized state set by the reproduced carrier wave of a frequency different from that of the carrier wave, the carrier reproducing loop is temporarily cut off for a preset period of time at the time of occurrence of abnormal synchronization and the oscillator (voltage-controlled oscillator) is operated by a predetermined reference signal to oscillate at a frequency extremely close to the frequency of normal synchronization, then the carrier reproducing loop is restored to the initial state to achieve the normal synchronization. The level of data as represented by the demodulated eye pattern on the phase plane is sampled by a two-multiplied clock of the reproducing clock signal, abnormal synchronization is detected by monitoring values at the intermediate points between signal points, and when the abnormal synchronization is detected and no carrier pull-out occurs, the carrier reproducing circuit generates a reproduced carrier wave at a frequency corresponding to a frequency which causes the normal synchronization, and then the loop is restored to the initial state so as to prevent occurrence of abnormal synchronization.

That is, when no pull-out occurs and abnormal synchronization caused by the reproduced carrier wave of a frequency different from the carrier frequency is detected, then a reference signal is temporarily supplied to the oscillator (voltage-controlled oscillator) provided in the carrier reproducing loop so as to cause the oscillator to generate a carrier signal having a frequency extremely close to the frequency of normal synchronization, and after this, the loop is restored to the initial state to effect the pull-in operation, thus preventing occurrence of abnormals synchronization.

As described above, occurrence of abnormal synchronization can be prevented in such an easy manner that a reference signal is temporarily supplied to the oscillator (voltage-controlled oscillator) provided in the carrier reproducing loop so as to cause the oscillator to generate a carrier signal having a frequency extremely close to the frequency of normal synchronization when the abnormal synchronization is detected, and after this, the loop is restored to the initial state to effect the pull-in operation. Further, since the abnormal synchronization is detected by monitoring the demodulated eye pattern in the phase point lying in an intermediate position between the signal points, a demodulation device of the quadrature amplitude modulation type digital radio device which can prevent occurrence of abnormal synchronization with simple construction can be provided.

Next, an error correction circuit used for the digital microwave radio communication of $2^{2m}$-value (m=1, 2, 3, ...) quadrature amplitude modulation system (which is hereinafter referred to as a QAM modulation system) according to a second embodiment of this invention is explained.

As described before, among the digital microwave radio communication devices using the multiple value QAM modulation system as the modulation system, devices using the modulation system of 4 PSK and 16 QAM, for example, are now most widely used. With the increasing demand for the communication network, it is required to increase the transmission capacity in the same frequency band in the digital microwave radio communication. In order to meet the requirement, the number of multiple values in the modulation system may be increased, thereby to reduce the data-error rate in the communication network. To this end, it will be necessary to use an error correction code.

That is, the modulation system is changed from the 4 PSK or 16 QAM modulation system to the 64 QAM or 256 QAM modulation system having a larger number of multiple values. With an increase in the number of multiple values, higher precision is required for the amplitude characteristic, delay characteristic, linearity and the like in the hardware design.

However, there is a limitation of possibility for enhancing the precision of the hardware. The insufficient enhancement of precision of the hardware deteriorates the bit error rate characteristic of the multiple value QAM indicating the performance of the digital microwave radio communication, that is, the relation of the bit error rate (BER) with respect to the ratio of thermal noise power to signal power. If the characteristic is further deteriorated, there occurs a residual bit error which is a phenomenon in which the bit error rate (bit error) is held at a low level and cannot be further suppressed to a smaller value.

In order to remove the residual bit error, an error correction circuit is proposed and is widely used.

Figure 10:
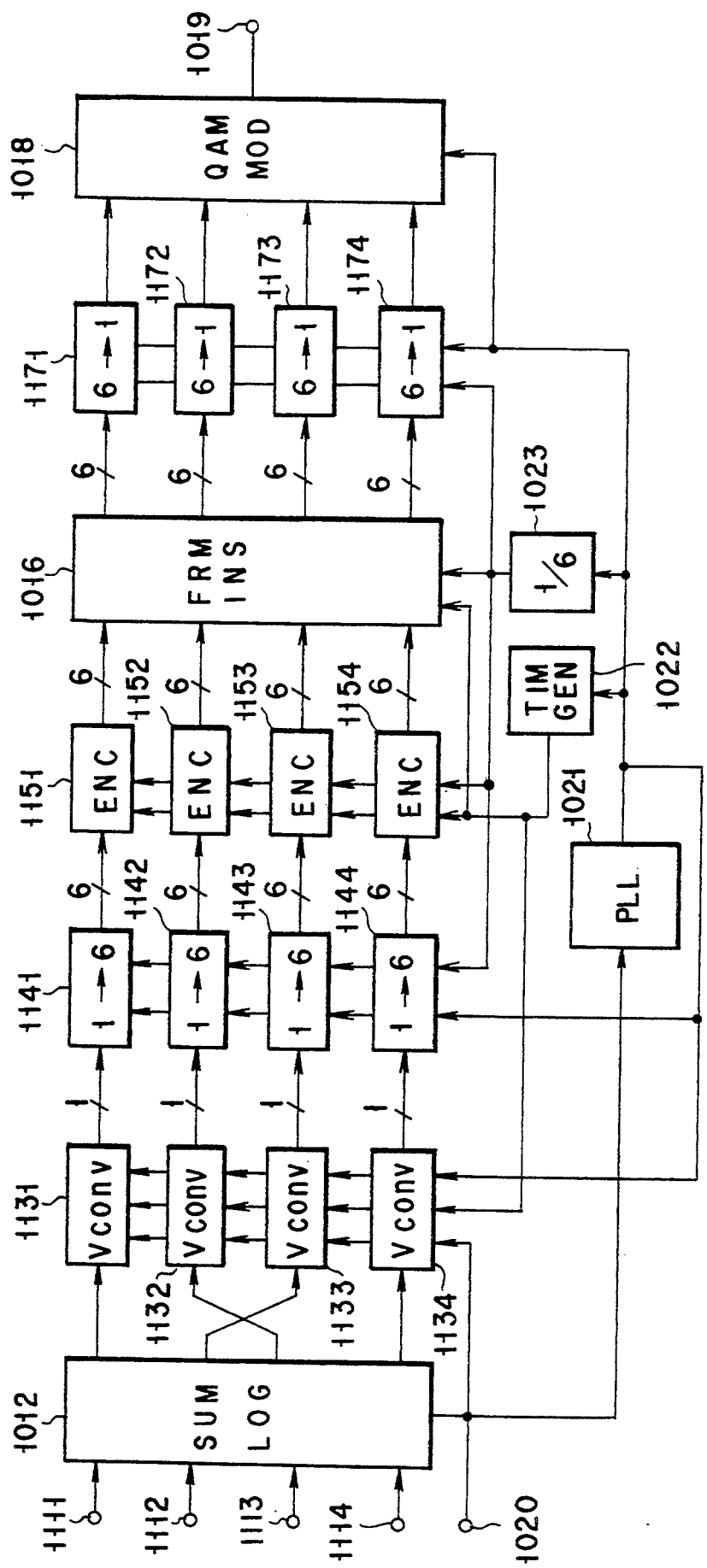
FIG. 10 is a block diagram showing an example of the construction of an error correction circuit (encoder side) according to this invention.

FIG. 10 is a block diagram showing an example of the construction of the error correction circuit (which is hereinafter referred to as FEC), and in this example, a GF($2^6$) Reed-Solomon code is used in 16 QAM modulation system.

Four-series input signals supplied to input terminals 1111 to 114 are input to a sum logic circuit 1012 for the sum logical operation, and supplied to speed converting circuits 1131 to 1134 and the operation speeds thereof are converted to 64/59 times the original value.

The thus speed-converted outputs are respectively converted into the 6-series parallel form by one-series/six-series serial-parallel converting circuits 1141 to 1144, parity bits are added to the respective outputs in FEC coding circuits 1151 to 1154, frame bits are added to the outputs in a frame insertion circuit 16, then the six-series outputs are respectively converted into the one-series form by six-series/one-series parallel-serial converting circuits 1171 to 1174 to restore the original four-series signals which are in turn supplied to a QAM modulation circuit 18, and a modulated signal is output from an output terminal 1019. An element indicated by a reference numeral 1020 is a clock input terminal, an element indicated by a reference numeral 21 is a PLL circuit, an element indicated by a reference numeral 22 is a timing generator, and an element indicated by a reference numeral 1023 is a clock frequency-dividing circuit.

With the above construction, since the one-series signal is converted from the serial form into the six-series parallel form and the symbol error correction with six bits used as one symbol can be used, a larger number of bits can be corrected and a burst error can also be corrected.

Further, since the clock speed can be changed to is converted into the six-series parallel form, it becomes possible to use a system of higher operation speed.

In the above FEC, several bits may be sometimes added as the parity bit to detect the error position. In this case, it is necessary to enhance the speed of the clock to the clock input terminal 1020 by an amount corresponding to the number of parity bits. In order to enhance the clock speed, a speed converting circuit for changing the clock speed is required. In the speed converting circuit, an elastic store of one chip which can independently effect the write-in and readout operations is used as a buffer memory, for example. However, an element used for the elastic store cannot be used for the memory whose baud rate is several MHz because the operation speed thereof is 6×MHz.

A method for solving the above problem is explained.

According to this invention, an error correction circuit capable of sufficiently coping with a speed m times the critical operation speed of the element of the elastic store can be provided as will be explained below.

FIG. 11 shows an example in which this invention is applied to an error correction circuit using the GF ($2^6$) (63, 59, 4) Reed-Solomon code used on the encoder side of the 16 QAM modulation type digital microwave radio device.

As shown in FIG. 11, the error correction circuit includes a sum logic circuit 1032, frame insertion circuit 1036, QAM modulation circuit 1038, output terminal 1039, clock input terminal 1040, PLL circuit 1041, input terminals 1311 to 1314, one-series/six-series serial-parallel converting circuits 1331 to 1334, 1/6-clock frequency dividing circuits 1431 and 1433, speed converting circuits 1341 to 1344, FEC coding circuits 1351 to 1354, and six-series/one-series parallel-serial converting circuits 1371 to 1374.

The input terminals 1311 to 1314 are supplied with four-series input signals. The four-series signals input to the input terminals 1311 to 1314 are supplied to the sum logic circuit 1032.

Outputs of the sum logic circuit 1032 are supplied to the one-series/six-series serial-parallel converting circuits 1331 to 1334.

Each of the one-series/six-series serial-parallel converting circuits 1331 to 1334 converts a one-series input signal into a six-series parallel signal and converts the operation speed to 1/6 times the original operation speed.

The serial-parallel conversion in the one-series/six-series serial-parallel converting circuits 1331 to 1334 is effected in response to a clock signal CLK input to the clock input terminal 1040 and a clock CLK1 which is output from the 1/6-clock frequency dividing circuit 1431 and whose frequency is divided by 6.

Signals which are respectively converted into the six-series parallel form by the one-series/six-series serial-parallel converting circuits 1331 to 1334 are respectively supplied to the speed converting circuits 1341 to 1344.

The speed converting circuits 1341 to 1344 use a one-chip element of elastic store for conversion of the data speed, and convert the operation speed of a signal converted into the parallel form to 64/59 times the original value to create spaces for insertion of the parity and frame bits. In this case, the speed conversion in the speed converting circuits 1341 to 1344 is effected based on clocks CLK1 and CLK3 which are output from the 1/6-clock frequency dividing circuits 1431 and 1432 and whose frequencies are divided by 6 and a timing signal FRM output from the timing generator 1042.

The signals which are subjected to the speed conversion by the speed converting circuits 1341 to 1344 are supplied to the FEC coding circuits 1351 to 1354.

The 1/6-clock frequency dividing circuit 1431 is a circuit for dividing the frequency of the clock CLK by 6 and the 1/6-clock frequency dividing circuits 1433 is a circuit for dividing the frequency of the clock CLK2 output from the PLL circuit 1041 by 6 and outputting the frequency-divided clock.

The FEC coding circuits 1351 to 1354 add predetermined parity bits to respective spaces which are provided to insert parity bits of the signals which are subjected to the speed conversion in the speed converting circuits 1341 to 1344.

The signals to which the predetermined parity bits are added by the FEC coding circuits 1351 to 1354 are supplied to the frame insertion circuit 1036.

The frame insertion circuit 1036 adds predetermined frame bits to respective spaces which are provided to insert frame bits of the signals which are subjected to the speed conversion in the speed converting circuits 1341 to 1344.

The signals to which the predetermined parity and frame bits are added by the FEC coding circuits 1351 to 1354 and frame insertion circuit 1036 are supplied to the six-series/one-series parallel-serial converting circuits 1371 to 1374.

The six-series/one-series parallel-serial converting circuits 1371 to 1374 respectively convert the six-series parallel signals into one-series signals each taking the serial form so as to restore the four-series signals. The parallel-series conversion in the six-series/one-series parallel-serial converting circuits 1371 to 1374 is effected in response to the clock CLK3 which is output from the 1/6-clock frequency dividing circuit 1432 and whose frequency is divided by 6.

The signals converted into the four-series form by the six-series/one-series parallel-serial converting circuits 1371 to 1374 are supplied to the QAM modulation circuit 1038. The result of modulation in the QAM modulation circuit 1038 is output from the output terminal 1039.

The PLL circuit 1041 generates a clock signal CLK2 such that the pulse obtained by dividing the frequency of the clock signal CLK supplied from the clock input terminal 1040 by 59 rises at the same time the pulse obtained by dividing the frequency of the clock signal CLK2 by 64 falls.

Next, the operation of the embodiment with the above construction is explained.

Assume now that four-series input signals are supplied from the digital processing unit of the transmission system to the input terminals 1311 to 1324. The four-series signals are supplied to the sum logic circuit 1032.

Then, the input signals are subjected to the sum logical operation in the sum logic circuit 1032 and respectively supplied to the one-series/six-series serial-parallel converting circuits 1331 to 1334.

Each of the one-series/six-series serial-parallel converting circuits 1331 to 1334 converts the one-series signal of serial form into a six-series parallel signal and changes the operation speed thereof to 1/6 times the original speed.

The reason why the one-series signal is converted into the six-series signal by each of the one-series/six-series serial-parallel converting circuits 1331 to 1334 is that error correction is effected with six bits treated as one symbol in the GF ($2^6$) (63, 59, 4) Reed-Solomon code.

In this case, the serial-parallel conversion in the one-series/six-series serial-parallel converting circuits 1331 to 1334 is effected in response to the clock signal CLK supplied from the clock input terminal 1040 and the clock CLK1 which is output from the 1/6-clock frequency dividing circuit 1431 and whose frequency is divided by 6.

The signals converted into the six-series form by the one-series/six-series serial-parallel converting circuits 1331 to 1334 are supplied to the speed converting circuits 1341 to 1344. Then, the operation speed of the parallel signals converted into the six-series form is converted to 64/59 times the original speed, and at the same time, spaces for insertion of the parity and frame bits are created.

In this case, the speed conversion in the speed converting circuits 1341 to 1344 is effected in response to the clocks CLK1 and CLK3 which are respectively output from the 1/6-clock frequency dividing circuits 1431 and 1433 and whose frequency is divided by 6 and a timing signal FRM output from the timing generator 1042.

The signals whose operation speeds are converted to 64/59 times the original speed by the speed converting circuits 1341 to 1344 are supplied to the FEC coding circuits 1351 to 1354 and predetermined parity bits are added to the spaces provided for insertion of parity bits. Then, the signals subjected to the above process are supplied to the frame insertion circuit 1036 and predetermined frame bits are added to the spaces provided for insertion of frame bits.

The signals to which the parity and frame bits are added by the FEC coding circuits 1351 to 1354 and frame insertion circuit 1036 are supplied to the six-series/one-series parallel-serial converting circuits 1371 to 1374 and the six-series parallel signals are respectively converted into one-series signals each of which takes the serial form, thus restoring the four-series signals.

In this case, the parallel-serial conversion in the six-series/one-series parallel-serial converting circuits 1371 to 1374 is effected in response to the clock CLK3 which is output from the 1/6-clock frequency dividing circuit 1432 and whose frequency is divided by 6.

The signals converted into the four-series form by the six-series/one-series parallel-serial converting circuits 1371 to 1374 are supplied to the QAM modulation circuit 1038 which in turn effects QAM (quadrature modulation) and whose modulated output signal is output from the output terminal 1039 to the frequency converter as an output of the modulation circuit.

As described above, in this invention, the one-series signals each taking the serial form are respectively converted into six-series parallel signals by the one-series/six-series serial-parallel converting circuits 1331 to 1334 to set the transmission speed thereof to 1/6 times the original speed and then the operation speed of the parallel signals converted into the six-series form is converted to 64/59 times the original speed by the speed converting circuit 1034. That is, the speed conversion in the speed converting circuits 1341 to 1344 is effected by using the signal whose clock speed is lowered after the one-series/six-parallel serial-parallel conversion. For this reason, the baud rate up to six times the baud rate set in the circuit in which the speed converting circuit is provided in the preceding stage of the one-series/six-series serial-parallel converting circuits can be used. That is, if the critical operation speed of the element of elastic store used in the clock speed converting circuit is $\times$MHz, the speed up to 6$\times$MHz can be used.

In the above embodiment, the error correction circuit used on the encoder side of the digital microwave radio device is explained, the same explanation can be made for an error correction circuit used on the decoder side of the digital microwave radio device.

Figure 12:
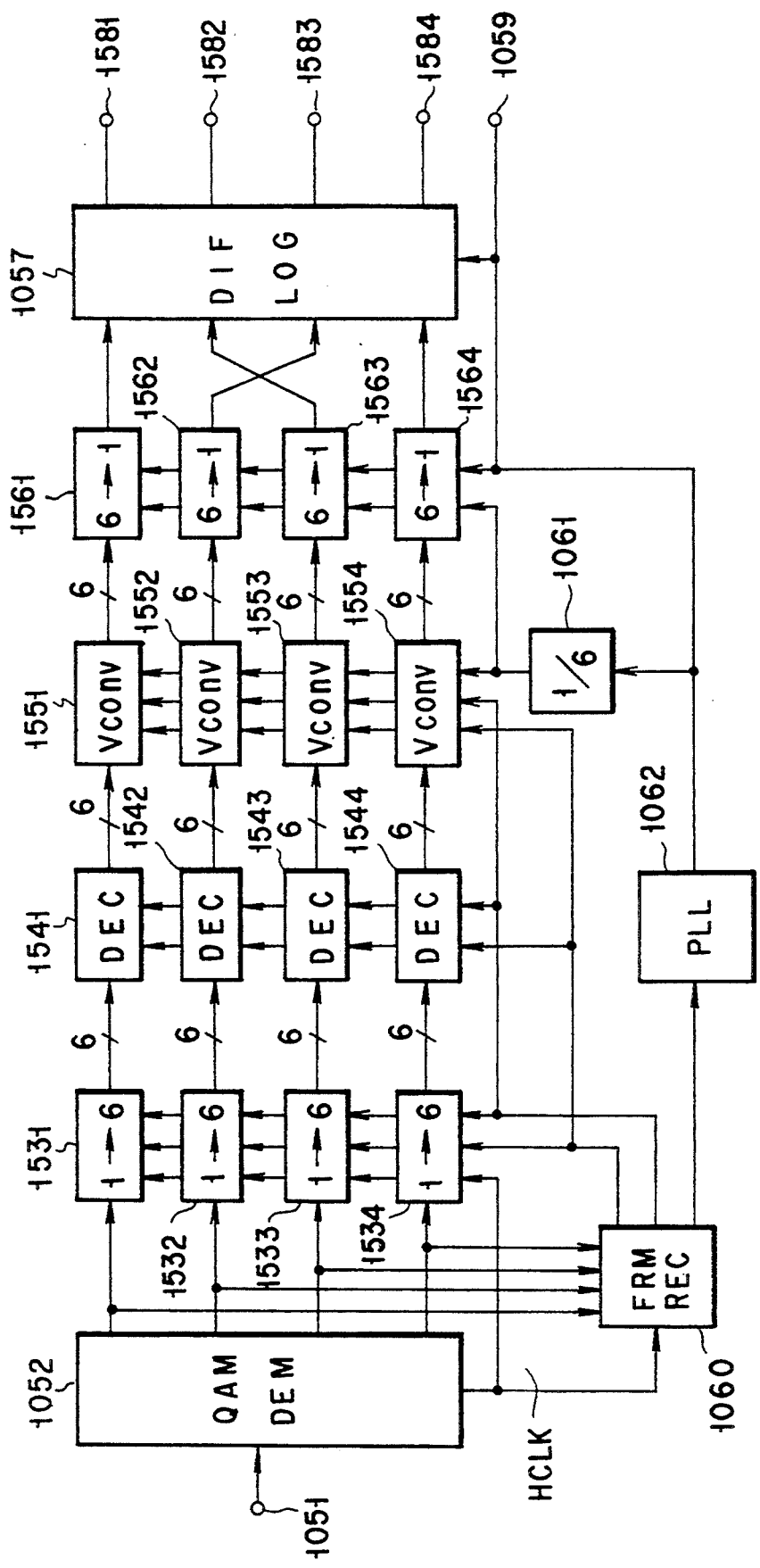
FIG. 12 is a block diagram showing still another example of the construction of an error correction circuit (decoder side) according to this invention.

FIG. 12 shows an example in which this invention is applied to an error correction circuit used on the decoder side of the 16 QAM modulation type digital microwave radio device. Also, in this case, the error correction circuit uses the GF ($2^6$) (63, 59, 4) Reed-Solomon code.

In this case, a QAM demodulating circuit 1052 demodulates a 16 QAM modulated wave signal input from the frequency converter to an input terminal 1051, and outputs four-series digital signals. From these digital signals, a frame synchronization circuit 1060 detects the frame bits which have been inserted on the encoder side. The circuit 1060 outputs timing pulses which are synchronous with the frames. The timing pulses are supplied to four demodulation circuits. In response to the timing pulses, the demodulation circuits output signals, which are supplied to one-series/six-series serial-parallel converters 1531 to 1534. Each serial-parallel converter converts the input signal into a six-series parallel form.

That is, by the serial-parallel conversion, the signal speed is converted to 1/6 times the original speed. Signals converted into the parallel form are supplied to FEC decoding circuits 1541 to 1544, decoded, subjected to the error correction and then supplied to speed converting circuits 1551 to 1554. The speeds of the signals are converted to 59/64 times the original speed in the speed converting circuits 1551 to 1554 and the spaces of the parity and frame bits are eliminated.

Next, the six-series parallel signals are respectively converted into one-series signals by six-series/one-series parallel-serial converting circuits 1561 to 1564. The signals each converted into the serial form are supplied to a demodulation logic circuit 1057 and subjected to the difference logic operation, and the results of the difference logic operation are output from output terminals 1581 to 1584. Outputs from the output terminals 1581 to 1584 are supplied to the digital processing unit of the reception system. In this case, an element denoted by a reference numeral 1059 is a clock input terminal, an element denoted by a reference numeral 1060 is a frame synchronization circuit, an element denoted by a reference numeral 1061 is a 1/6-clock frequency dividing circuit, and an element denoted by a reference numeral 1062 is a PLL circuit.

In the above error correction circuit, the same effect as described above can be obtained by providing the speed converting circuits 1551 to 1554 in the preceding stages of the six-series/one-series parallel-serial converting circuits 1561 to 1564. That is, if the critical operation speed of the element of elastic store used in the clock speed variable circuit is ×MHz, the speed up to 6×MHz can be used.

The embodiment of the error correction circuit has been described as the second embodiment, but this invention is not limited to the above embodiment. For example, in the above embodiment, an example in which this invention is applied to the error correction circuit using the GF (2$^6$) (63, 59, 4) Reed-Solomon code is explained, but the same effect can be obtained in a p$^m$-element (P is a primary number and m is a positive integer) non-2-element error correction circuit. Further, in the above embodiment, the transmission signals are divided into six series, subjected to various processes, and then converted into the one-series form, but they may be converted into m/4-series form or a m×n-series form (n is a positive integer) as required.

Since the error correction circuit of this invention with the above construction subjects the signals which are converted into the m-series parallel form to the speed conversion, the clock speed of the signals input to the speed converting circuits can be lowered to 1/m times the original speed and therefore an element of the operation speed corresponding to the clock speed can be satisfactorily used. Conversely, data of transmission speed which is m times the critical operation speed of the element of elastic store used in the speed converting circuit can be processed.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A demodulation device of a quadrature amplitude modulation type digital radio device having an oscillator means with an oscillation frequency controlled by a control signal, wherein identifying means for identifying levels of demodulated base band signals to derive a value corresponding to the levels, phase difference detection means for deriving a phase difference signal of a reproduced carrier wave based on the value, the phase difference signal is used as the control signal to control the oscillation frequency so as to derive an oscillation frequency corresponding to the phase difference signal, an output signal having the thus derived frequency is used as the reproduced carrier wave, the reproduced carrier wave is subjected to a 90° phase-shifting process to create two reproduced carrier waves with 90° phase difference which are separately multiplied with a reception signal to create demodulated base band signals, clock reproducing means for reproducing a transmission clock signal from the demodulated base band signals to define timings for identification of the levels of the demodulated base band signals, and the reception signal is restored based on the value derived by the identification, comprising:

monitoring means for monitoring the carrier pull-out based on the demodulated base band signals and outputting a carrier pull-out alarm signal when the carrier pull-out occurs;

abnormal synchronization detecting means for sampling the reception signal level at a speed twice the transmission speed of the reception data based on the identification value derived by the identification and for detecting abnormal synchronization when a detection area of the sampled data derived by abnormal synchronization detecting means corresponds to a predetermined area of a plurality of areas;

abnormal synchronization signal generating means for generating a signal for a preset period of time, when the abnormal synchronization is detected and the carrier pull-out alarm signal is not generated; and selection means for receiving a reference signal used for generating a signal having a reference carrier frequency nearly equal to the frequency of the carrier and the phase difference signal, selecting the phase difference signal as the control signal in the normal operation state, selecting the reference signal as the control signal and supplying the same to the oscillator means while receiving an output signal of said abnormal synchronization signal generating means; wherein said identifying means is operated at a speed twice the transmission clock to effect the identification.

2. A demodulation device of a quadrature amplitude modulation type digital radio device according to claim 1, wherein said oscillator means is a voltage-controlled oscillator.

3. A demodulation device of a quadrature amplitude modulation type digital radio device according to claim 1, wherein said identifying means includes a first A/D converting means for subjecting a component of one of two quadrature axes for quadrature modulation to the analog-digital conversion and a second A/D converting means for subjecting a component of the other axis to the analog-digital conversion and said first A/D converting means and second A/D converting means effect the sampling operation by use of a clock twice the reproducing transmission clock.

4. A demodulation device of a quadrature amplitude modulation type digital radio device according to claim 1, wherein said identifying means includes a first A/D converting means for subjecting a component of one of two quadrature axes for quadrature modulation to the analog-digital conversion and a second A/D converting means for subjecting a component of the other axis to analog-digital conversion, said first A/D converting means and said second A/D converting means are constructed to effect the sampling operation by use of a clock twice the reproducing transmission clock and at least said first A/D converting means has an overflow-/underflow terminal for generating a signal when the demodulated baseband signal of a level exceeding a predetermined level range is supplied;

said abnormal synchronization generating means includes a first shift register for shifting first-pass output data of said first A/D converting means, a second shift register for shifting an overflow/underflow output of said first A/D converting means, logical processing means for logically processing output data of plural passes of said second A/D converting means to determine whether or not data is detected in a specified area which is previously determined on the phase plane, a first gate for deriving a logical AND of outputs of said first and second shift registers and an output of said logical processing means, a second gate for deriving a logical AND of an output of said first gate and the pull-out alarm signal, and switching signal generating means for supplying a switching signal to said selection means while receiving an output of said second gate so as to cause said selection means to select the reference signal as the control signal.

5. An abnormal synchronization preventing method used at a time of restoring a reception signal in a demodulation device of a quadrature amplitude modulation type digital radio device in which a phase difference signal is derived based on levels of demodulation base band signals derived by identifying means, an oscillation frequency corresponding to the phase difference signal is determined by using the phase difference signal as a control signal for controlling the oscillation frequency and is used as a reproduced carrier wave, the reproduced carrier wave is subjected to a 90° phase-shifting process to create two reproduced carrier waves which are separately multiplied with a reception signal to create demodulated base band signals, a transmission clock of the reception signal is reproduced from the demodulated base band signals to define timings for identification of the levels of the demodulated base band signals, and the reception signal is restored based on a value derived by the identification, an abnormal synchronization preventing method used at the time of restoring the reception signal based on the value derived by the identification, comprising the steps of:

monitoring the carrier pull-out based on the demodulated base band signals and outputting a carrier pull-out alarm signal when the carrier pull-out occurs;

causing said identifying means to effect the sampling operation at a speed twice that of the transmission clock and generate the value;

detecting the level of the reception signal based on the value derived by the identification and detecting abnormal synchronization according to whether or not the detected area lies in a predetermined area;

generating an abnormal synchronization detection signal for a preset period of time when the abnormal synchronization is detected in a case where the carrier pull-out alarm signal is not generated; and selecting the phase difference signal among a reference signal used for generating a signal having a reference carrier frequency nearly equal to the frequency of the carrier and the phase difference signal as the control signal in the normal operation state and using the reference signal as the control signal while the abnormal synchronization detection signal is generated.

6. An abnormal synchronization preventing method used at a time of demodulation in the multiple value quadrature modulation type digital radio communication which uses a Costas type carrier reproducing loop and in which two reproduced carrier waves having a 90° phase difference from each other are derived based on a reproduced carrier wave, the two reproduced carrier waves are multiplied with a reception signal to demodulate the reception signal and derive demodulated base band signals, a transmission clock is reproduced based on the demodulated base band signals, the demodulated base band signals are sampled in synchronism with the reproduced clock signal, the sampled signals are converted to identification data items corresponding to the levels thereof, and data is restored based on the identification data items, comprising:

a step of multiplying the reproduced clock by 2;

a step of sampling the demodulated base band signals in synchronism with the two-multiplied reproduced clock which is multiplied by 2 in said step of multiplying;

a step of extracting data items at points other than synchronized points of the reproduced clock from data items obtained in said step of sampling;

a carrier pull-out monitoring step for detecting the pull-out of the reproduced carrier wave having the same frequency as a carrier wave of the reception signal;

a step of monitoring abnormal synchronization corresponding to a synchronized state set up by a carrier wave having a frequency different from that of the reproduced wave;

a step of monitoring whether or not the carrier wave produced by oscillation means is out of phase with the carrier wave of the input signal;

a step of detecting a normal synchronization achieved by the carrier wave produced by said oscillation means and having the same frequency of the carrier wave of the input signal, and an abnormal synchronization caused by the carrier wave produced by said oscillation means and having a frequency different from that of the carrier wave of the input signal; and a step of stopping said carrier reproducing loop for a preset period when an abnormal synchronization is detected, causing said oscillation means to oscillate at a frequency extremely close to that of the carrier wave of the input signal, and driving said carrier reproducing loop, thereby achieving normal synchronization.

* * * * *